United States Patent
Ertas et al.

(10) Patent No.: US 12,449,030 B2
(45) Date of Patent: *Oct. 21, 2025

(54) MOUNTING ASSEMBLY FOR A GEARBOX ASSEMBLY

(71) Applicants: General Electric Company, Evendale, OH (US); GE Avio S.r.l., Rivalta di Torino (IT)

(72) Inventors: Bugra H. Ertas, Niskayuna, NY (US); Ravindra Shankar Ganiger, Bengaluru (IN); Andrea Piazza, Turin (IT); Brandon W. Miller, Middletown, OH (US)

(73) Assignees: GENERAL ELECTRIC COMPANY, Evendale, OH (US); GE AVIO S.R.L., Rivalta di Torino (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/910,919

(22) Filed: Oct. 9, 2024

(65) Prior Publication Data

US 2025/0035206 A1 Jan. 30, 2025

Related U.S. Application Data

(63) Continuation-in-part of application No. 17/929,105, filed on Sep. 1, 2022, now Pat. No. 12,203,418.

(30) Foreign Application Priority Data

Apr. 25, 2022 (IN) .............................. 202211024200

(51) Int. Cl.
*F16H 57/025* (2012.01)
*F02C 7/36* (2006.01)
(Continued)

(52) U.S. Cl.
CPC .............. *F16H 57/025* (2013.01); *F02C 7/36* (2013.01); *F16H 1/2818* (2013.01);
(Continued)

(58) Field of Classification Search
CPC .... F16H 1/2818; F16H 1/2827; F16H 1/2845; F16H 57/025; F16H 57/08; F02C 7/36
See application file for complete search history.

(56) References Cited

U.S. PATENT DOCUMENTS

| | | |
|---|---|---|
| 2,616,308 A | 11/1952 | Burnett |
| 5,433,674 A | 7/1995 | Sheridan et al. |

(Continued)

FOREIGN PATENT DOCUMENTS

| | | |
|---|---|---|
| CN | 108302162 A | 7/2018 |
| FR | 3127024 A1 | 3/2023 |

(Continued)

OTHER PUBLICATIONS

Anderson, et al., "Advanced Gearbox Technology Final Report," Allison Gas Turbine Division, General Motors Corporation, NASA Lewis Research Center, Jun. 1987.
(Continued)

*Primary Examiner* — Topaz L. Elliott
(74) *Attorney, Agent, or Firm* — Venable LLP; Peter T. Hrubiec; Michele V. Frank

(57) ABSTRACT

A mounting assembly for a gearbox assembly of a gas turbine engine includes at least one mounting member configured to mount a gear of the gearbox assembly to a component of the gas turbine engine, the at least one mounting member characterized by a lateral impedance parameter, a bending impedance parameter, and a torsional impedance parameter. A gas turbine engine includes the mounting assembly. The at least one mounting member may be a flex mount, a fan frame, or a flex coupling. The gear
(Continued)

includes a first gear that is a split sun gear including a forward sun gear and an aft sun gear separate from the forward sun gear. The forward sun gear and the aft sun gear are each rotationally coupled to a rotating shaft of the gas turbine engine.

20 Claims, 20 Drawing Sheets

(51) Int. Cl.
    *F16H 1/28* (2006.01)
    *F16H 57/02* (2012.01)
    *F16H 57/023* (2012.01)

(52) U.S. Cl.
    CPC ......... *F16H 1/2827* (2013.01); *F16H 1/2845* (2013.01); *F16H 57/023* (2013.01); *F16H 2057/02039* (2013.01)

(56) References Cited

U.S. PATENT DOCUMENTS

| | | | |
|---|---|---|---|
| 5,540,630 | A | 7/1996 | Vranish |
| 7,874,953 | B2 | 1/2011 | Shamie et al. |
| 8,297,916 | B1 | 10/2012 | McCune et al. |
| 8,297,917 | B1 | 10/2012 | McCune et al. |
| 8,747,055 | B2 | 6/2014 | McCune et al. |
| 8,770,922 | B2 | 7/2014 | McCune et al. |
| 8,814,503 | B2 | 8/2014 | McCune et al. |
| 8,899,915 | B2 | 12/2014 | McCune et al. |
| 9,631,558 | B2 | 4/2017 | McCune et al. |
| 10,301,968 | B2 | 5/2019 | McCune et al. |
| 10,378,643 | B2 | 8/2019 | Cintula |
| 10,392,119 | B2 | 8/2019 | Niergarth et al. |
| 10,487,917 | B2 * | 11/2019 | Chmylkowski ............ F02C 7/36 |
| 10,823,260 | B2 * | 11/2020 | Gravina ................... F16H 57/08 |
| 10,890,247 | B2 * | 1/2021 | Gravina ............. F16H 57/0456 |
| 11,021,997 | B2 | 6/2021 | McCune et al. |
| 11,187,303 | B1 | 11/2021 | Elmore et al. |
| 11,377,199 | B2 | 7/2022 | Mitrovic |
| 11,454,314 | B2 | 9/2022 | Zhang |
| 2007/0225111 | A1 | 9/2007 | Duong et al. |
| 2009/0111639 | A1* | 4/2009 | Klingels ............... F16H 1/2836 475/347 |
| 2010/0105516 | A1 | 4/2010 | Sheridan et al. |
| 2012/0225748 | A1 | 9/2012 | Michel et al. |
| 2013/0067931 | A1 | 3/2013 | Hindle et al. |
| 2013/0287575 | A1 | 10/2013 | McCune et al. |
| 2015/0308351 | A1 | 10/2015 | Sheridan |
| 2017/0108084 | A1* | 4/2017 | Chmylkowski ........... F16H 1/34 |
| 2017/0122426 | A1 | 5/2017 | Miller et al. |
| 2019/0113127 | A1* | 4/2019 | Gravina .................... F02C 7/06 |
| 2019/0120363 | A1 | 4/2019 | Grubba |
| 2019/0368577 | A1* | 12/2019 | Ronchiato ............. F01D 25/164 |
| 2020/0003128 | A1 | 1/2020 | Maguire et al. |
| 2020/0088106 | A1 | 3/2020 | Miller et al. |
| 2021/0172381 | A1 | 6/2021 | Spruce |
| 2023/0212987 | A1 | 7/2023 | Payyoor et al. |
| 2023/0235715 | A1 | 7/2023 | McCune et al. |

FOREIGN PATENT DOCUMENTS

| | | |
|---|---|---|
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130875 A1 | 6/2023 |
| JP | 2004316474 A | 11/2004 |
| JP | 4192661 B2 | 12/2008 |
| WO | 2023037074 A1 | 3/2023 |
| WO | 2023037075 A1 | 3/2023 |

OTHER PUBLICATIONS

Jay Bennett, "Rolls-Royce Sets Record for Most Powerful Turbofan Gearbox In the World," Popular Mechanics, published Sep. 6, 2017, https://www.popularmechanics.com/flight/news/a28082/rolls-royce-record-most-powerful-turbofan-gearbox-aircraft-engine/, as viewed on Feb. 28, 2024.

* cited by examiner

MOUNTING ASSEMBLY FOR A GEARBOX ASSEMBLY

CROSS REFERENCE TO RELATED APPLICATIONS

The present application is a continuation-in-part application of U.S. patent application Ser. No. 17/929,105, filed on Sep. 1, 2022, which claims the benefit of Indian patent application Ser. No. 20/221,1024200, filed on Apr. 25, 2022, the entire contents of which are incorporated by reference in their entireties.

TECHNICAL FIELD

The present disclosure relates to a mounting assembly for a gearbox assembly of a gas turbine engine. In particular, the present disclosure relates to at least one impedance parameter for a gearbox assembly mounting assembly for a gas turbine engine.

BACKGROUND

A gas turbine engine includes a fan driven by a turbine. A gearbox assembly is coupled between the fan and the turbine. The gearbox assembly provides a speed decrease between the turbine and the fan. The gearbox assembly is mounted to a static structure of the engine via one or more mounting members.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, or structurally similar elements.

DETAILED DESCRIPTION

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. More particularly, forward and aft are used herein with reference to a direction of travel of the vehicle and a direction of propulsive thrust of the gas turbine engine.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

Figure 7:
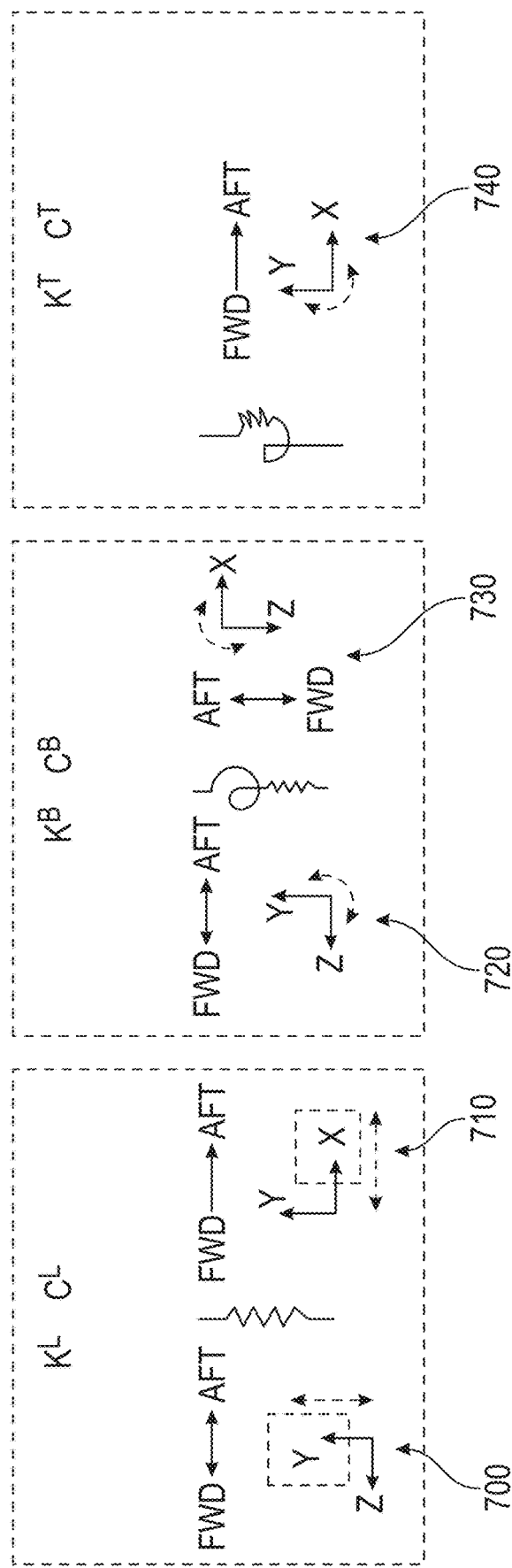
FIG. 7A shows a schematic of the degrees of freedom of lateral stiffness, according to an embodiment of the present disclosure.
FIG. 7B shows a schematic of the degrees of freedom of bending stiffness, according to an embodiment of the present disclosure.
FIG. 7C shows a schematic of the degrees of freedom of torsional stiffness, according to an embodiment of the present disclosure.

The terms "lateral stiffness" and "lateral structural stiffness" are used interchangeably and refer to the stiffness of a component having degrees of freedom in the lateral and the radial directions. That is, the stiffness of a component in the radial direction (direction Y in FIGS. 1 and 7A) and the lateral direction (direction X in FIG. 7A; into and out of the page in FIG. 1). The lateral stiffness is defined as shown in FIG. 7A. The lateral stiffness is identified herein as $K^L$.

The terms "bending stiffness" and "bending structural stiffness" are used interchangeably and refer to the stiffness of a component having degrees of freedom in the pitch and the yaw directions. That is, the stiffness of a component in the pitch direction (about the Y and Z plane in FIG. 7B) and the yaw direction (about the Z and X plane in FIG. 7B). The bending stiffness is defined as shown in FIG. 7B. The bending stiffness is identified herein as $K^B$.

The term "casing "herein refers to the structure that defines an airflow path (e.g., wall of duct, or casing). A mounting to the casing may be a direct bolted connection or through a load bearing frame.

A "static structure" as herein referred means any structural part of an engine that is non-rotating.

The terms "torsional stiffness" and "torsional structural stiffness" are used interchangeably and refer to the stiffness of a component having degrees of freedom in the torsional or rotational direction about an engine centerline (about the X and Y plane in FIG. 7C, about the engine centerline). The torsional stiffness is defined as shown in FIG. 7C. The torsional stiffness herein is identified as $K^T$.

The term "lateral damping" refers to the structural damping of a component in the lateral direction at a frequency of vibration. The lateral damping is identified herein as $C^L$.

The term "bending damping" refers to the structural damping of a component in the bending direction at a frequency of vibration. The bending damping is identified herein as $C^B$.

The term "torsional damping" refers to the structural damping of a component in the torsional or rotational direction at a frequency of vibration. The torsional damping is identified herein as $C^T$.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

The loading of a gas turbine engine, while the engine is producing thrust, induces thrust reaction forces through the aircraft-engine mounting points. For example, the mount points to a wing pylon induce during a take-off or a climb sequence a net bending moment about the pitch axis. The resulting deflections cause relative movement among, e.g., turbine shaft(s), mid-frame, engine casing, front frame, etc. These relative movements, occurring sometimes at different rates (depending on flight conditions) result in coupled loads among the supporting structure, engine frames, shafts, casing etc. This results in relative movements, bending, or shifting at different rates and to different degrees (depending on load paths, flexible/stiff joints, parts etc.). The bending of the engine also deforms the casing of the engine along its length. The degree to which components move relative to each other depends on how they are connecting to each other, the material used and the structural dynamic properties of the interconnected structure supporting the components. If these aspects of engine design are not fully taken into consideration, there may result misalignments resulting in pre-mature failure or wear of component parts, e.g., bearings, seals, etc.

One such component affected by the dynamic loading of the engine is a power gearbox, utilized to transfer power from a turbine shaft to a main fan. Such gearboxes may include a sun gear, a plurality of planet gears, and a ring gear. The sun gear meshes with the plurality of planet gears and the plurality of planet gears mesh with the ring gear. In operation, the gearbox transfers the torque transmitted from a turbine shaft operating at a first speed to a fan shaft rotating at a second, lower speed. For a planet configuration of the gearbox, the sun gear may be coupled to the mid-shaft of a lower pressure turbine rotating at the first speed. The planet gears, intermeshed with the sun gear, then transfer this torque to the fan shaft through a planet carrier. In a star configuration, a ring gear is coupled to the fan shaft. In either configuration, the gearbox is supported by, for example, a flex mount, a flex coupling, and a fan frame coupling.

The relative movements of the frames supporting the gearbox and input/output shafts for the gearbox, as a result of the aforementioned loading on the engine, can cause not insignificant relative movements among the moving parts of the power gearbox, i.e., the gears, carrier, ring etc. resulting in misalignments in the geartrain. This misalignment then causes distortions or eccentric loading, in particular, the torque loads are not uniformly resolved, or uniformly distributed among the gears. This results in edge loading and high stresses within the individual gears and the gearbox assembly, which may result in degradation of gear life, failure, or breakage of the gears.

As engines increase in thrust and power, the loading environments described become more challenging to accommodate while assuring sufficient life and durability of a gearbox assembly. The inventors, having a need to improve upon the existing support structure for power gearboxes to support mission requirements, designed several different configurations of gearbox supports to arrive at an improved design, better suited to handle the loads environment for particular flight conditions in different architectures, thereby extending life of parts in a gearbox and avoiding premature failure events.

Figure 1:
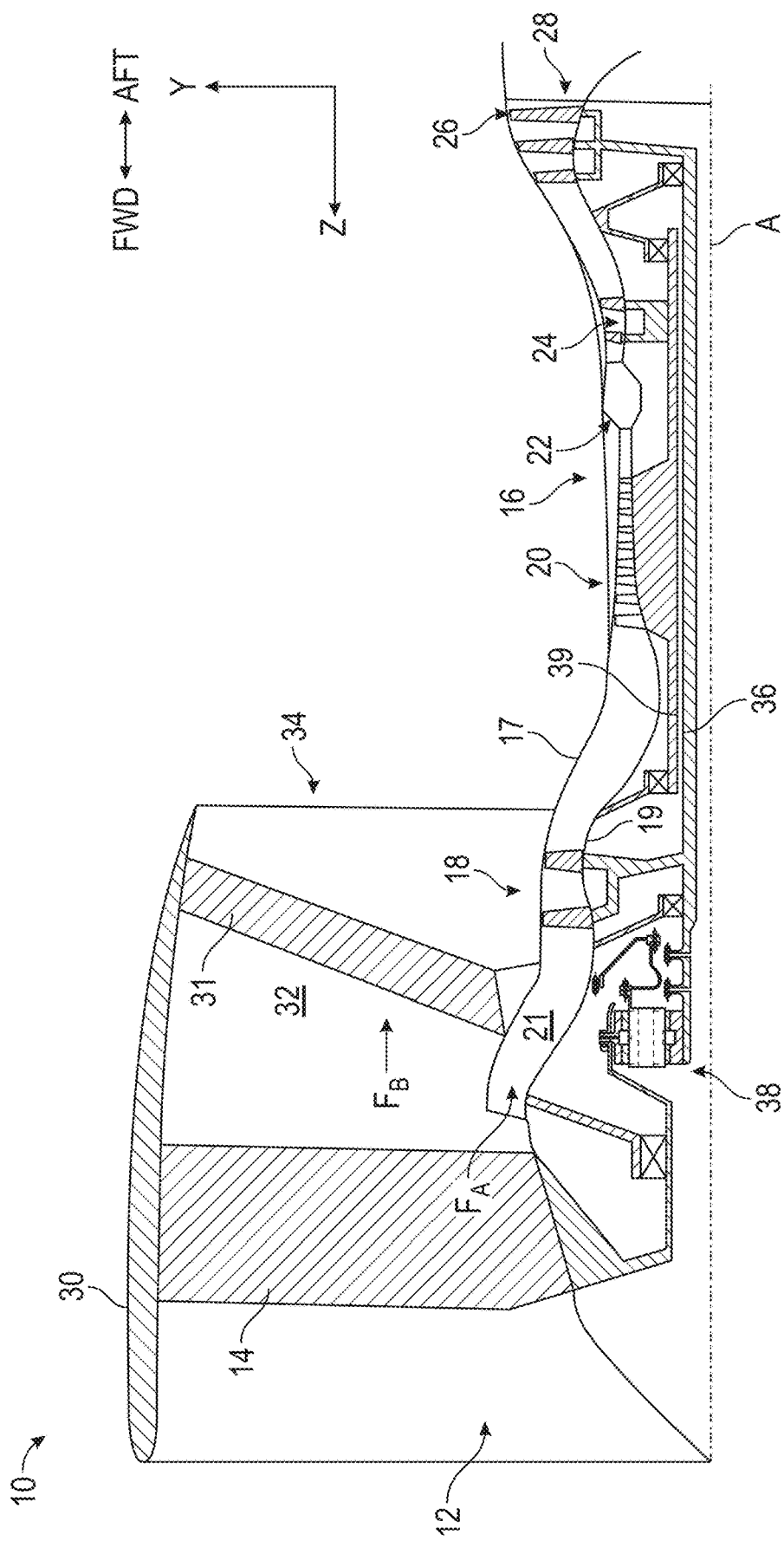
FIG. 1 shows a schematic, cross-sectional view of a gas turbine engine, taken along a centerline of the gas turbine engine, according to an embodiment of the present disclosure.

FIG. 1 shows a schematic cross-sectional view of a gas turbine engine 10 taken along a center axis, also referred to as a longitudinal centerline axis A that is a principal rotational axis. The gas turbine engine 10 includes an air intake 12 and a fan 14 that generates two airflows: a core airflow $F_A$ and a bypass airflow $F_B$. The gas turbine engine 10 includes an engine core 16 that receives the core airflow $F_A$. The engine core 16 includes a casing 17 that encircles, in axial flow series, a low-pressure compressor 18, a high-pressure compressor 20, a combustion section 22, a high-pressure turbine 24, a low-pressure turbine 26, and a core exhaust nozzle 28. The casing 17 generally defines a core flow passage 21 through which the core airflow $F_A$ flows. A nacelle 30, via an engine frame strut 31, surrounds the gas turbine engine 10 and may serve as an outlet guide vane. The nacelle 30 defines a bypass duct 32 and a bypass exhaust nozzle 34. The bypass airflow $F_B$ flows through the bypass duct 32. The fan 14 is coupled to and driven by the low-pressure turbine 26 via a low-pressure (LP) shaft 36 and a gearbox assembly 38.

In use, the core airflow $F_A$ is accelerated and compressed by the low-pressure compressor 18 and directed into the high-pressure compressor 20 where further compression takes place. The compressed air exhausted from the high-pressure compressor 20 is directed into the combustion section 22 where it is mixed with fuel and the mixture is combusted. The resultant hot combustion products then expand through, and thereby drive, the high-pressure turbine 24 and the low-pressure turbine 26 before being exhausted through the core exhaust nozzle 28. This provides propulsive thrust. The high-pressure turbine 24 drives the high-pressure compressor 20 by a high-pressure shaft 39. The fan 14 generally provides the majority of the propulsive thrust. The gearbox assembly 38 is a reduction gearbox, power gearbox that delivers a torque from the LP shaft 36 running at a first speed, to a fan shaft coupled to fan 14 running at a second, slower speed.

Figure 2:
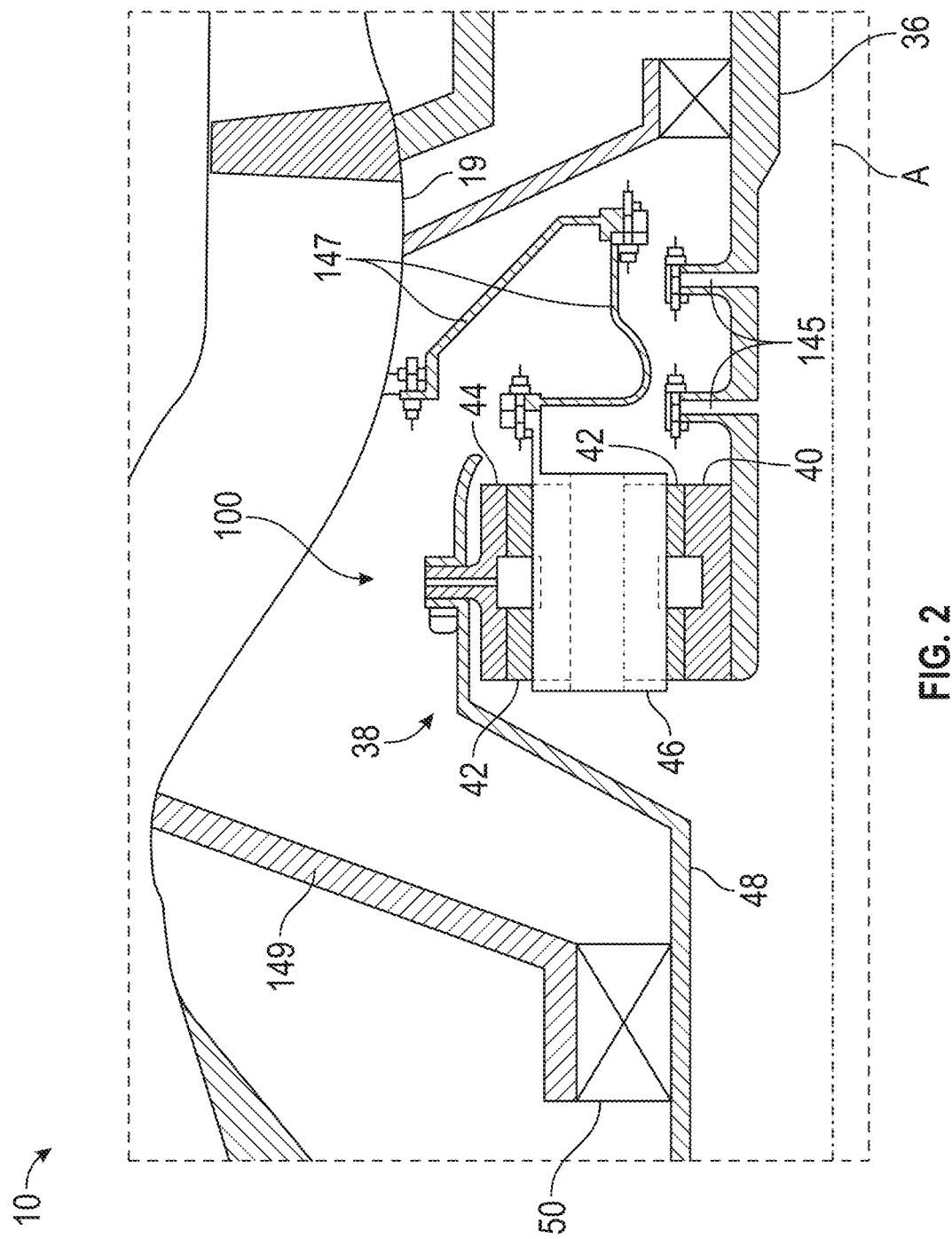
FIG. 2 shows an enlarged, schematic, cross-sectional view of a gearbox assembly of a gas turbine engine, taken along a centerline of the gas turbine engine, according to an embodiment of the present disclosure.
Figure 3:
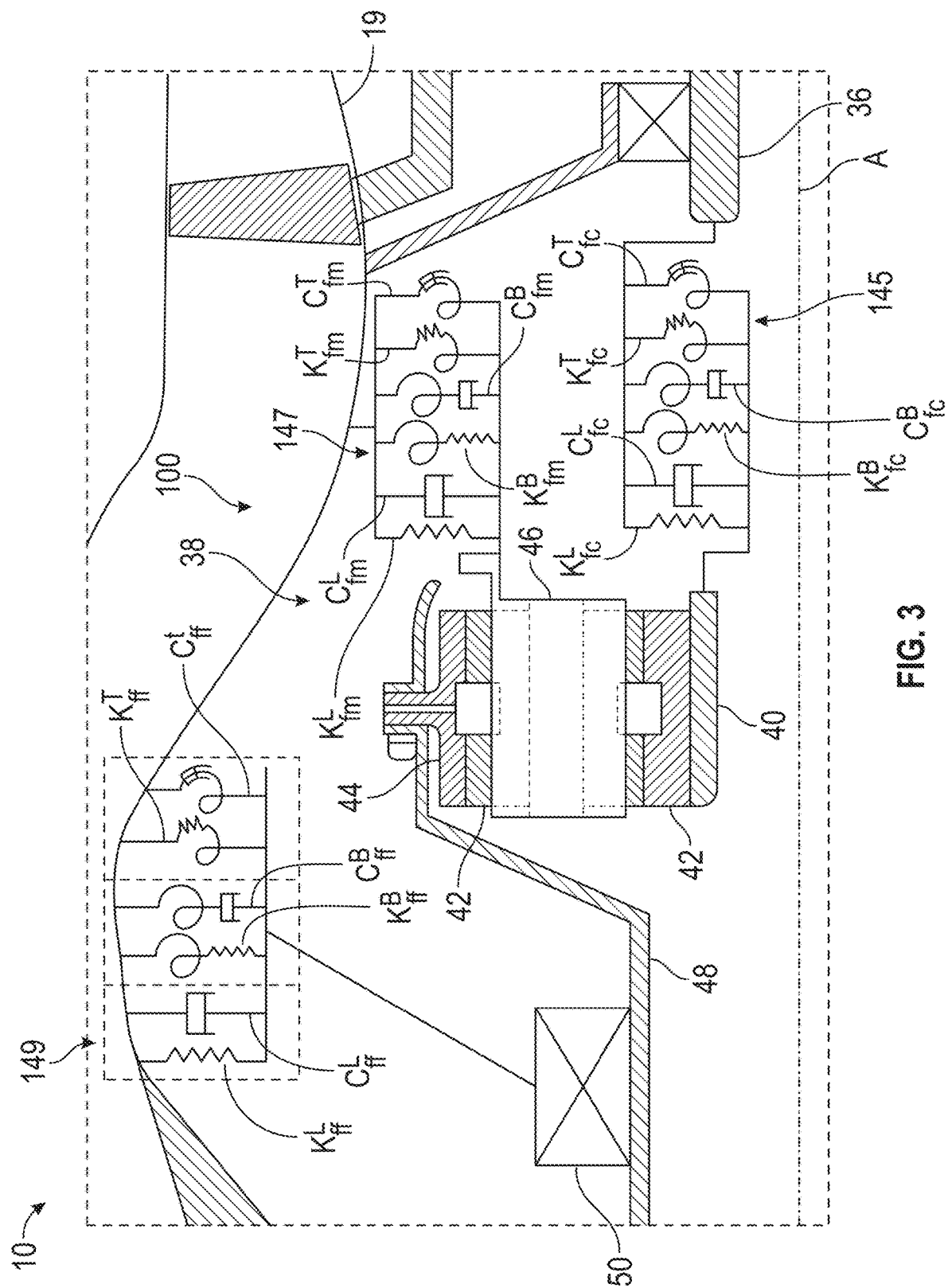
FIG. 3 shows a schematic, cross-sectional view of the gearbox assembly of FIG. 2, translated into a representative vibratory system.

FIGS. 2 and 3 illustrate enlarged, schematic side cross-sectional views of the gearbox assembly 38 of FIG. 1 with a mounting assembly 100. The mounting assembly 100 shown is that for a star configuration gearbox, described in more detail to follow. The gearbox assembly 38 includes a sun gear 40, a plurality of planet gears 42, and a ring gear 44. The low-pressure turbine 26 (FIG. 1) drives the low-pressure shaft 36, which is coupled to the sun gear 40 of the gearbox assembly 38. The sun gear 40 of the gearbox assembly 38 is coupled via a flex coupling 145 to the rotating low-pressure shaft 36.

Radially outwardly of the sun gear 40, and intermeshing therewith, is the plurality of planet gears 42 that are coupled together by a planet carrier 46. The planet carrier 46 of the gearbox assembly 38 is coupled, via a flex mount 147, to the engine static structure 19. The planet carrier 46 constrains the plurality of planet gears 42 while allowing each planet gear of the plurality of planet gears 42 to rotate about its own axis. Radially outwardly of the plurality of planet gears 42, and intermeshing therewith, is the ring gear 44, which is an annular ring gear 44. The ring gear 44 is coupled via a fan shaft 48 to the fan 14 (FIG. 1) in order to drive rotation of the fan 14 about the axis A. The fan shaft 48 is coupled to a fan frame 149 via a fan bearing 50. The fan frame 149 couples the rotating ring gear 44 of the gearbox assembly 38 and, thus, the rotating fan shaft 48, to the engine static structure 19. The flex coupling 145, the flex mount 147, and the fan frame 149 define the mounting assembly 100 for the gearbox assembly 38. As described herein, the flex coupling 145, the flex mount 147, and the fan frame 149 may be referred to as mounting members.

Although not depicted in FIGS. 2 and 3 for clarity, each of the sun gear 40, the plurality of planet gears 42, and the ring gear 44 includes teeth about their periphery to intermesh with the other gears. In the example of FIGS. 2 and 3, the gearbox assembly 38 is a star configuration. That is, the ring gear 44 rotates, while the planet carrier 46 is fixed and stationary. The planet carrier 46 constrains the plurality of planet gears 42 such that the plurality of planet gears 42 do not together rotate around the sun gear 40, while also enabling each planet gear of the plurality of planet gears 42 to rotate about its own axis. That is, since the plurality of planet gears 42 mesh with both the rotating ring gear 44 as well as the rotating sun gear 40, each of the plurality of planet gears 42 rotate about their own axes to drive the ring gear 44 to rotate about the longitudinal centerline axis A (FIG. 1) due to the rotation of the sun gear 40. The rotation of the ring gear is 44 conveyed to the fan 14 (FIG. 1) through the fan shaft 48.

FIG. 3 illustrates the mounting assembly 100 of FIG. 2 translated into a representative vibratory system where each of the flex coupling 145, the flex mount 147, and the fan frame 149 are shown by representative structural properties of the members, the representative structural properties being the structural stiffness (K) and the damping (C) of the respective members of the mounting assembly 100. As shown, each of the flex coupling 145, the flex mount 147, and the fan frame 149 includes the representative structural properties (structural stiffness and damping) in each of the lateral direction, the bending direction, and the torsional direction.

For example, FIG. 3 represents the gearbox supporting structure in terms of structural properties characterizing the nature of the coupling between the gearbox and the flex coupling 145. The flex coupling 145 may be represented in terms of a flex coupling lateral stiffness $K_{fc}^L$, a flex coupling bending stiffness $K_{fc}^B$, a flex coupling torsional stiffness $K_{fc}^T$, a flex coupling lateral damping $C_{fc}^L$, a flex coupling bending damping $C_{fc}^B$, and a flex coupling torsional damping $C_{fc}^T$.

FIG. 3 represents the gearbox supporting structure in terms of structural properties characterizing the nature of the coupling between the gearbox and the flex mount 147. The flex mount 147 may be represented in terms of a flex mount lateral stiffness $K_{fm}^L$, a flex mount bending stiffness $K_{fm}^B$, a flex mount torsional stiffness $K_{fm}^T$, a flex mount lateral damping $C_{fm}^L$, a flex mount bending damping $C_{fm}^B$, and a flex mount torsional damping $C_{fm}^T$.

FIG. 3 represents the gearbox supporting structure in terms of structural properties characterizing the nature of the coupling between the gearbox and the fan frame 149. The fan frame 149 may be represented in terms of fan frame lateral stiffness $K_{ff}^L$, a fan frame bending stiffness $K_{ff}^B$, a fan frame torsional stiffness $K_{ff}^T$, a fan frame lateral damping $C_{ff}^L$, a fan frame bending damping $C_{ff}^B$, and a fan frame torsional damping $C_{ff}^T$.

Figure 4:
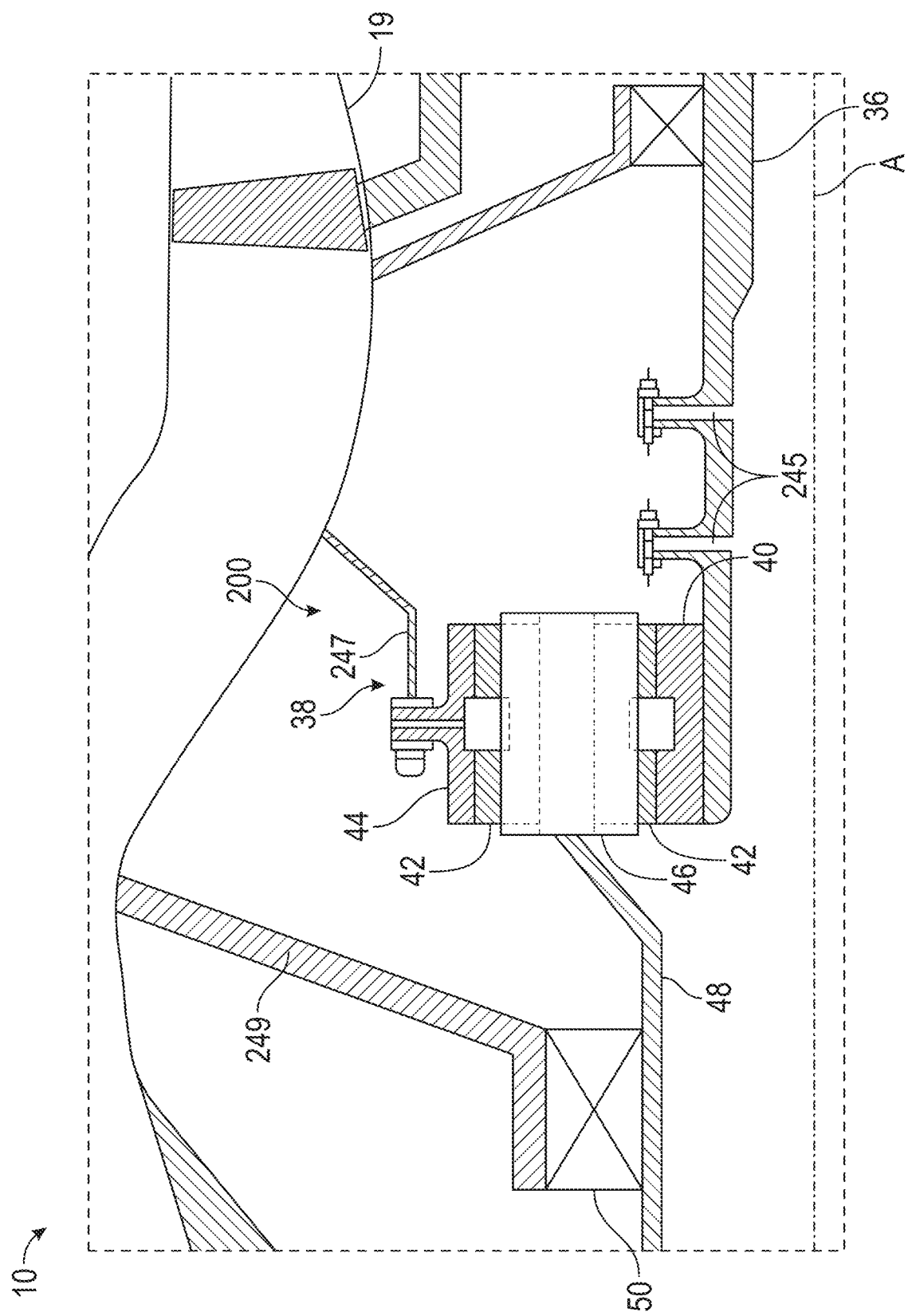
FIG. 4 shows an enlarged, schematic, cross-sectional view of a gearbox assembly of a gas turbine engine, taken along a centerline of the gas turbine engine, according to an embodiment of the present disclosure.
Figure 5:
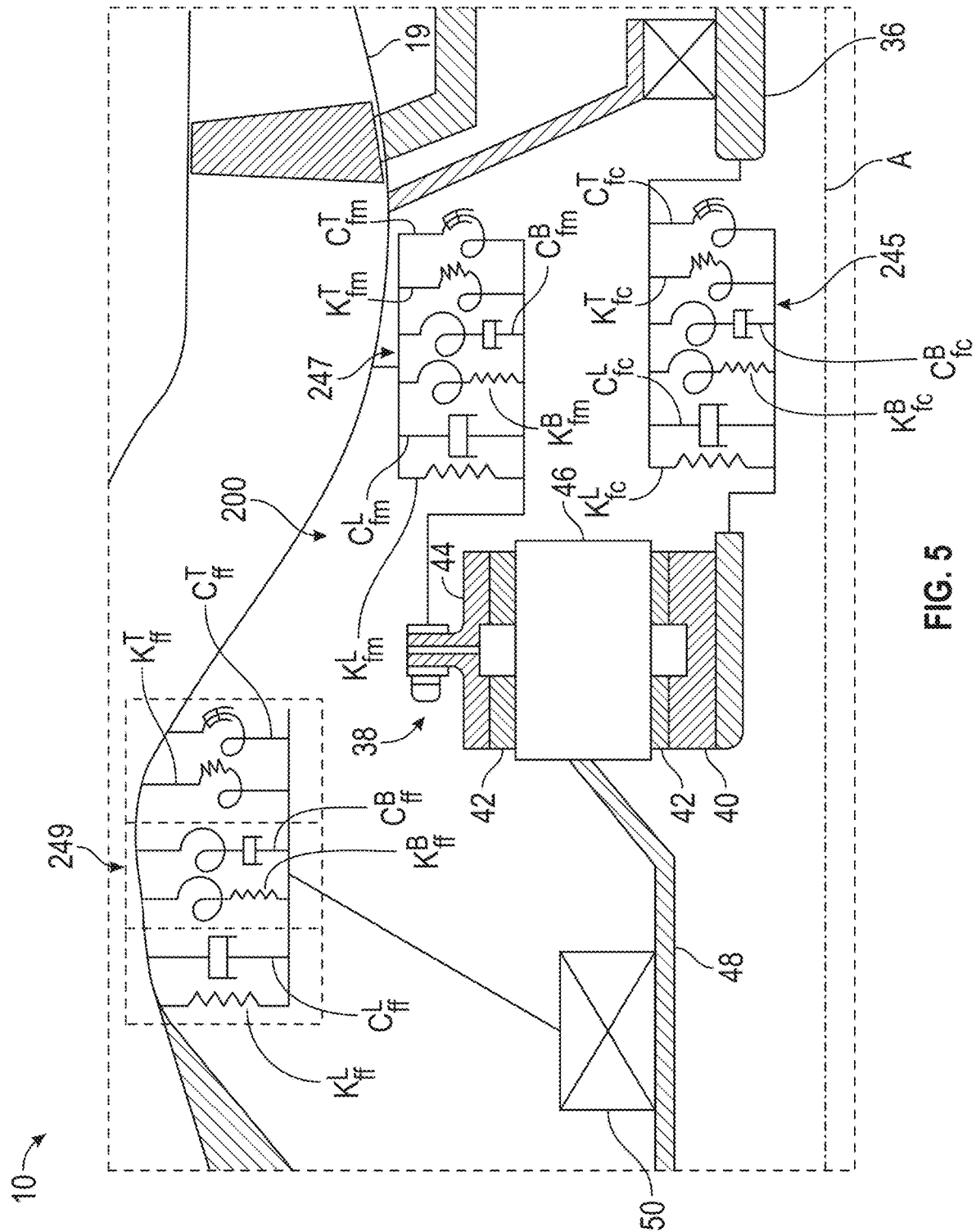
FIG. 5 shows a schematic, cross-sectional view of the gearbox assembly of FIG. 4, translated into a representative vibratory system.

FIGS. 4 and 5 illustrate enlarged, schematic side cross-sectional views of the gearbox assembly 38 of FIG. 1 with a mounting assembly 200. The mounting assembly 200 shown is that for a planetary configuration gearbox, described in more detail to follow. As mentioned, the gearbox assembly 38 includes the sun gear 40, the plurality of planet gears 42, and the ring gear 44. The low-pressure turbine 26 (FIG. 1) drives the low-pressure shaft 36, which is coupled to the sun gear 40 of the gearbox assembly 38. The sun gear 40 is coupled via a flex coupling 245 to the low-pressure shaft 36.

Radially outwardly of the sun gear 40, and intermeshing therewith, is the plurality of planet gears 42 that are coupled together by a planet carrier 46. The planet carrier 46 is coupled, via the fan shaft 48, to the fan 14 (FIG. 1) to drive rotation of the fan 14 about the axis A. The fan shaft 48 is coupled to a fan frame 249 via the fan bearing 50. The planet carrier 46 constrains the plurality of planet gears 42 to rotate together about the sun gear 40, while also allowing each planet gear of the plurality of planet gears 42 to rotate about its own axis. Thus, the plurality of planet gears 42, the planet carrier 46, and the sun gear 40 rotate about the longitudinal centerline axis A. Radially outwardly of the plurality of planet gears 42, and intermeshing therewith, is the ring gear 44, which is an annular ring gear 44. The ring gear 44 is coupled via a flex mount 247 to the engine static structure 19. The flex coupling 245, the flex mount 247, and the fan frame 249 define the mounting assembly 200 for the gearbox assembly 38. As described herein, the flex coupling 245, the flex mount 247, and the fan frame 249 may be referred to as mounting members.

Although not depicted in FIGS. 4 and 5 for clarity, each of the sun gear 40, the plurality of planet gears 42, and the ring gear 44 includes teeth about their periphery to intermesh with the other gears. In the example of FIGS. 4 and 5, the gearbox assembly 38 is a planetary configuration. That is, the ring gear 44 is static (being fixedly mounted via the flex mount 247 to the engine static structure 19), while the planet carrier 46 and the plurality of planet gears 42 therein, rotate about the longitudinal centerline axis A. The planet carrier 46 constrains the plurality of planet gears 42 such that the plurality of planet gears 42 rotate together around the sun gear 40, while also enabling each planet gear of the plurality of planet gears 42 to rotate about its own axis. The rotation of the planet carrier 46 is conveyed to the fan 14 (FIG. 1) through the fan shaft 48.

FIG. 5 illustrates the mounting assembly 200 of FIG. 4 translated into a representative vibratory system where each of the flex coupling 245, the flex mount 247, and the fan frame 249 are shown by representative structural properties of the members, the representative structural properties being the structural stiffness (K) and the damping (C) of the respective members of the mounting assembly 200. As shown, each of the flex coupling 245, the flex mount 247, and the fan frame 249 includes the representative structural properties (structural stiffness and damping) in each of the lateral direction, the bending direction, and the torsional direction.

For example, FIG. 5 represents the gearbox supporting structure in terms of structural properties characterizing the nature of the coupling between the gearbox and the flex coupling 245. The flex coupling 245 may be represented in terms of a flex coupling lateral stiffness $K_{fc}^{L}$, a flex coupling bending stiffness $K_{fc}^{B}$, a flex coupling torsional stiffness $K_{fc}^{T}$, a flex coupling lateral damping $C_{fc}^{L}$, a flex coupling bending damping $C_{fc}^{B}$, and a flex coupling torsional damping $C_{fc}^{T}$.

FIG. 5 represents the gearbox supporting structure in terms of structural properties characterizing the nature of the coupling between the gearbox and the flex mount 247. The flex mount 247 may be represented in terms of a flex mount lateral stiffness $K_{fm}^{L}$, a flex mount bending stiffness $K_{fm}^{B}$, a flex mount torsional stiffness $K_{fm}^{T}$, a flex mount lateral damping $C_{fm}^{L}$, a flex mount bending damping $C_{fm}^{B}$, and a flex mount torsional damping $C_{fm}^{T}$.

FIG. 5 represents the gearbox supporting structure in terms of structural properties characterizing the nature of the coupling between the gearbox and the fan frame 249. The fan frame 249 may be represented in terms of a fan frame lateral stiffness $K_{ff}^{L}$, a fan frame bending stiffness $K_{ff}^{B}$, a fan frame torsional stiffness $K_{ff}^{T}$, a fan frame lateral damping $C_{ff}^{L}$, a fan frame bending damping $C_{ff}^{B}$, and a fan frame torsional damping $C_{ff}^{T}$.

The gearbox mounting systems and configurations in FIGS. 2 and 4 can be translated into a representative vibratory system, as shown in FIGS. 3 and 5, respectively. Each interface to the gear box, whether a fan frame, flex mount, or flex coupling has geometric qualities that translate to lateral, bending, and torsional stiffness and damping elements. For example, the flex mount support system may have relatively thin-walled undulating supports engineered to possess specific values for stiffness and damping. Support wall thickness and support member span or extent play a critical role in determining stiffness and damping values. Thinner members certainly allow for lower values stiffness quantities and shorter spans or member lengths contribute to higher values stiffness properties. Similarly, the 2 flex mount flex elements on the input shaft use member thickness and outer diameter to control stiffness and damping. As member thickness decreases and diaphragm diameter increases, stiffness properties decrease in the mounting location. For the fan frame support, it is good practice to design this mounting element and location to be as stiff as possible while minimizing weight. The fan support frame needs a high degree of stiffness due to potential fan overloads that can occur; like in a blade out failure scenario. Therefore, the design approach for the flex mount and flex element lateral and bending stiffness values are desired to be notably softer than the fan support frame, which allows for the gearbox system to follow the fan frame support movement while generating low reaction forces and moments at the flex mount and flex coupling mounting locations. Conversely, the torsional stiffness of the flex mount and flex coupling mounting elements is desired to be design as stiff as possible since these elements are in the main torque transmission torque path with the fan.

Figure 6:
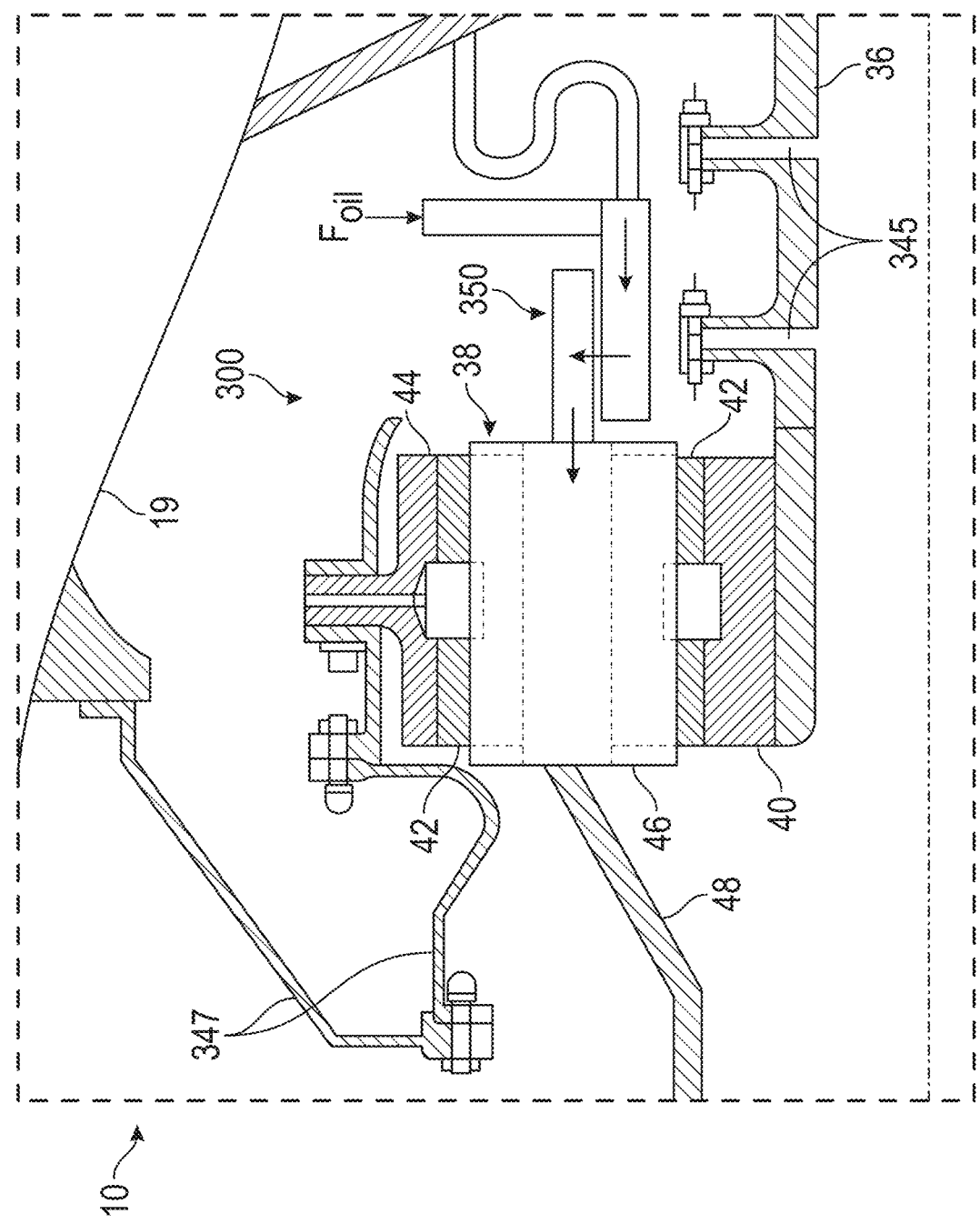
FIG. 6 shows a schematic, cross-sectional view of a gearbox assembly of a gas turbine engine with an oil transfer device, according to an embodiment of the present disclosure.

FIG. 6 illustrates an enlarged, schematic side view of the gearbox assembly 38 of FIG. 1 with a mounting assembly 300. The mounting assembly 300 is that for a planetary configuration, as described with respect to FIGS. 4 and 5. That is, the ring gear 44 is coupled with a flex mount 347 to the engine static structure 19. The plurality of planet gears 42 is constrained within a planet carrier 46, which is coupled to the fan shaft 48, and the sun gear 40 is coupled with a flex coupling 345 to the low-pressure shaft 36. Although not shown in FIG. 6, the fan shaft 48 may be coupled with a fan frame to the engine static structure, such as described with respect to FIGS. 4 and 5.

The gearbox assembly 38 may include an oil transfer device 350. The oil transfer device 350 allows an oil flow Foil to flow into the gearbox assembly 38 and to lubricate the plurality of planet gears 42, which in turn lubricates the sun gear 40 and the ring gear 44. Although shown with respect to a planetary configuration, the oil transfer device 350 may be provided in a gearbox assembly 38 having a star configuration (e.g., as shown and described with respect to FIGS. 2 and 3).

FIGS. 7A to 7C illustrate degrees of freedom associated with structural stiffness K and damping coefficient C. These degrees of freedom characterize the most significant directions of movement affecting the respective stiffness or damping properties of the component as it interacts with the gearbox and engine frame(s) supporting it under loading conditions. The structural stiffness K and the damping coefficient C representations allowed the inventors to quantify the structural dynamic behavior of these degrees of freedom in a sufficiently accurate and representative manner, accounting for all factors in the component design that effects load transmission into the gearbox.

In FIGS. 7A to 7C, the Z-axis coincides with the engine centerline A (FIG. 1), the Y-axis extends perpendicular to the Z-axis in a radial direction (the radial direction upward and downward as shown in FIG. 1), and the X-axis extends perpendicular to the Z-axis in a radial direction (the radial direction into and out of the page as shown in FIG. 1).

In FIG. 7A, the lateral stiffness KL and the lateral damping $C^L$ affect the lateral stiffness and the lateral damping of the respective mounting component (e.g., the flex mount, the fan frame, and the flex coupling). This results in the lateral stiffness $K^L$ and the lateral damping $C^L$ affecting the movement of the respective component in the lateral direction. The lateral direction includes the linear motion of the component in a Y-axis radial direction 700 and an X-axis radial direction 710.

In FIG. 7B, the bending stiffness $K^B$ and the bending damping $C^B$ affect the bending stiffness and the bending damping of the respective mounting component (e.g., the flex mount, the fan frame, and the flex coupling). This results in the bending stiffness $K^B$ and the bending damping $C^B$ affecting the rotational movement of the respective component in the bending direction. The bending direction includes the bending or rotational motion of the component in a yaw direction 720 and a pitch direction 730.

In FIG. 7C, the torsional stiffness $K^T$ and the torsional damping $C^T$ affect the torsional stiffness and the torsional damping of the respective mounting component (e.g., the flex mount, the fan frame, and the flex coupling). This results in the torsional stiffness $K^T$ and the torsional damping $C^T$ affecting the rotational movement of the respective component in a torsional direction 740 about the engine centerline (e.g., about the centerline A or Z-axis as shown in FIG. 1). This represents the load path of the gears and the torque of the respective component with respect to the fan 14 (FIG. 1).

As detailed further below with respect to FIGS. 8 to 16, the sun gear 40 can be a split sun gear such that the sun gear 40 is formed of two separate pieces that are coupled to the LP shaft 36 and that may be, in some examples, coupled to each other. The split sun gear allows for a reduced radial size of the gearbox assembly 38, and, thus, a lower weight of the gearbox assembly, as compared to gearbox assemblies without a split sun gear. The present disclosure provides for examples of a split sun gear in conjunction with a single piece ring gear. The present disclosure provides for a gearbox assembly that prevents relative axial sliding of the two meshing gears (e.g., by preventing relative axial sliding of the split sun gear).

A single piece ring gear allows for a reduced radial envelope by eliminating a bolted connection between two separate pieces of a single piece ring gear. The combination of a split sun gear and a single piece ring gear allows for a lower radial envelope, easy packaging in the sump, flow path optimization (e.g., due to a low profile gearbox assembly), enhanced efficiency, and a lower weight with a higher reliability, as compared to a gearbox assembly having a split ring gear. A single piece ring gear also allows for a more flexible construction (as compared to a split, bolted ring gear) since there is no limitation to radial deflection that would normally be associated with a split, bolted ring gear. In a split ring gear, radial deflections are controlled and minimized to mitigate risk of fretting at the bolted connection. The more flexible construction, therefore, allows for a more uniform load share among the plurality of planet gears, which, in turn, provides a higher power density of the gearbox assembly. The more flexible construction and the reduced weight provided by the split sun gear and the single piece ring gear affect the stiffness (K) or damping (C) of at least one of the flex coupling, the flex mount, or the fan frame of the mounting assemblies disclosed herein. For example, at least one of the flex coupling, the flex mount, or the fan frame can be less stiff or have greater damping when a split sun gear and a single piece ring gear is used, as compared to a single piece sun gear and a split ring gear.

Figure 8:
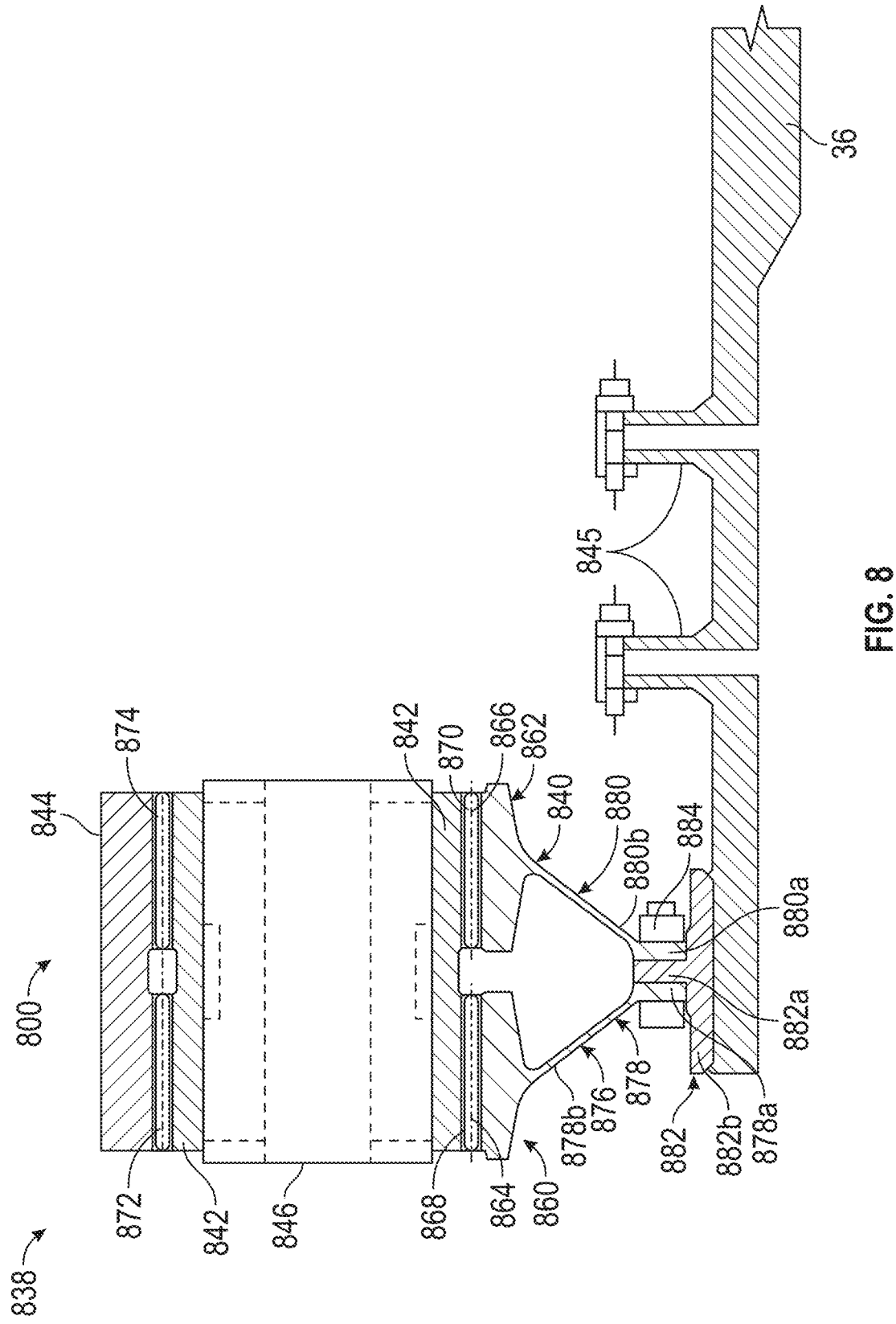
FIG. 8 shows a schematic, cross-sectional view of a gearbox assembly isolated from the gas turbine engine, taken along a centerline of the gas turbine engine, according to an embodiment of the present disclosure.

FIG. 8 is a schematic, cross-sectional side view of a gearbox assembly 838 with a mounting assembly 800, according to an embodiment of the present disclosure. The mounting assembly 800 may include any of the mounting assemblies disclosed herein (in FIGS. 1 to 6). The gearbox assembly 838 includes a sun gear 840, a plurality of planet gears 842, a ring gear 844, and a planet carrier 846. The mounting assembly 800 includes a flex coupling 845, a flex mount (not shown for clarity), and a fan frame (not shown for clarity). The flex coupling 845, the flex mount, and the fan frame can be any of the flex couplings, the flex mounts, or the fan frames, respectively, disclosed herein.

The sun gear 840 is also referred to herein as a split sun gear 840. That is, the sun gear 840 is formed of two separate components (e.g., a forward sun gear 860 and an aft sun gear 862) that have a connection device 876 to couple the two separate components together and to couple the sun gear 840 to the LP shaft 36 with the connection device 876.

The gearbox assembly 838 includes a gear train that is composed of double helical gears. The double helical gears include two rows of helical teeth that are of opposing helix angles. That is, the sun gear 840, each of the plurality of planet gears 842, and the annular ring gear 844 each comprise a double helical gear having gear teeth that mesh with the gear teeth of the adjacent double helical gear, as described in more detail to follow.

The ring gear 844 is a single piece ring gear. As used herein, "single piece" refers to a single, integral, and unitary component formed of only a single component with no bolted connection in the geared portion of the ring gear, though a bolted connection may be present in a connecting member coupling the ring gear to a static structure, such as the engine frame. The fan shaft 48 can be coupled to the ring gear 844 (similar to the embodiment of FIGS. 1 to 3) or can be coupled to the planet carrier 846 (similar to the embodiment of FIGS. 4 to 6).

As noted above, the sun gear 840 includes the forward sun gear 860 and the aft sun gear 862. Each of the sun gear 840, the plurality of planet gears 842, and the ring gear 844 comprises teeth about their periphery to intermesh with the other gears. In particular, the forward sun gear 860 of the sun gear 840 comprises a first set of sun gear teeth 864 and the aft sun gear 862 of the sun gear 840 comprises a second set of sun gear teeth 866. As discussed above, the sun gear 840 is a bi-helical gear or a double helical gear such that each of the first set of sun gear teeth 864 and the second set of sun gear teeth 866 are helical teeth angled relative to each other. Each of the plurality of planet gears 842 includes a first set of planet gear teeth 868 and a second set of planet gear teeth 870. As discussed above, each of the planet gears 842 is a bi-helical gear or a double helical gear such that each of the first set of planet gear teeth 868 and the second set of planet gear teeth 870 has helical teeth. The ring gear 844 includes a first set of ring gear teeth 872 and a second set of ring gear teeth 874. As discussed above, the ring gear 844 is a bi-helical gear or a double helical gear such that each of the first set of ring gear teeth 872 and the second set of ring gear teeth 874 has helical teeth.

In the gearbox assembly 838 of FIG. 8, the first set of sun gear teeth 864 of the forward sun gear 860 mesh with the first set of planet gear teeth 868 of each of the planet gears 842 and the second set of sun gear teeth 866 of the aft sun gear 862 mesh with the second set of planet gear teeth 870 of each of the planet gears. Likewise, the first set of planet gear teeth 868 and the second set of planet gear teeth 870 of each of the planet gears 842 meshes with the first set of ring gear teeth 872 and the second set of ring gear teeth 874 of the ring gear 844, respectively.

As noted above, the connection device 876 couples the split sun gear 840 to the LP shaft 36. The connection device 876 includes a forward support member 878, an aft support member 880, a shaft coupling member 882, and a fastening device 884.

The forward support member 878 includes a first portion 878a and a second portion 878b. The first portion 878a extends in the radial direction and includes an opening therethrough (not visible) for receiving the fastening device 884. The second portion 878b extends at an angle between the first portion 878a and the forward sun gear 860.

The aft support member 880 includes a first portion 880a and a second portion 880b. The first portion 880a extends in the radial direction and includes an opening therethrough (not visible) for receiving the fastening device 884. The second portion 880b extends at an angle between the first portion 880a and the aft sun gear 862.

The shaft coupling member 882 includes a first portion 882a and a second portion 882b. The first portion 882a extends in the radial direction between and parallel to the first portion 878a of the forward support member 878 and the first portion 880a of the aft support member 880. The first portion 882a includes an opening therethrough (not visible) for receiving the fastening device 884. The second portion 882b extends in an axial direction parallel to the LP shaft 36 and parallel to the longitudinal centerline axis A (FIG. 1). The second portion 882b is rotationally coupled to the LP shaft 36 such that rotation of the LP shaft 36 causes rotation of the second portion 882b and, therefore, rotation of the sun gear 840. In the example of FIG. 8, the second portion 882b is rotationally coupled to the LP shaft 36 with a spline, such as described in more detail with respect to FIGS. 9A and 9B.

The fastening device 884 extends through respective openings in the first portion 878a of the forward support member 878, the first portion 880a of the aft support member 880, and the first portion 882a of the shaft coupling member 882. The fastening device 884 is secured within the openings such that the forward support member 878, the aft support member 880, and the shaft coupling member 882 are fixedly attached together. In this manner, the forward sun gear 860 and the aft sun gear 862 are rotationally coupled to the LP shaft 36 by way of the connection device 876. As described herein, the fastening device 884 may be a bolt, screw, weld, anchor, river, or other mechanical fastener.

The illustration of FIG. 8 is a cross-sectional view taken along the longitudinal centerline axis A of the gas turbine engine 10, with half of the sun gear 840 omitted for simplicity. The sun gear 840, however, extends circumferentially about the longitudinal centerline axis A such that the forward sun gear 860, the aft sun gear 862, the forward support member 878, the aft support member 880, and the shaft coupling member 882 are each annular member. Accordingly, though a single fastening device 884 is shown and a single opening in each of the first portions 878a, 880a, and 882a are described, a plurality of fastening devices 244 may be provided in a circumferentially spaced manner about the longitudinal centerline axis A to secure the sun gear 840 to the LP shaft 36.

Figure 9A:
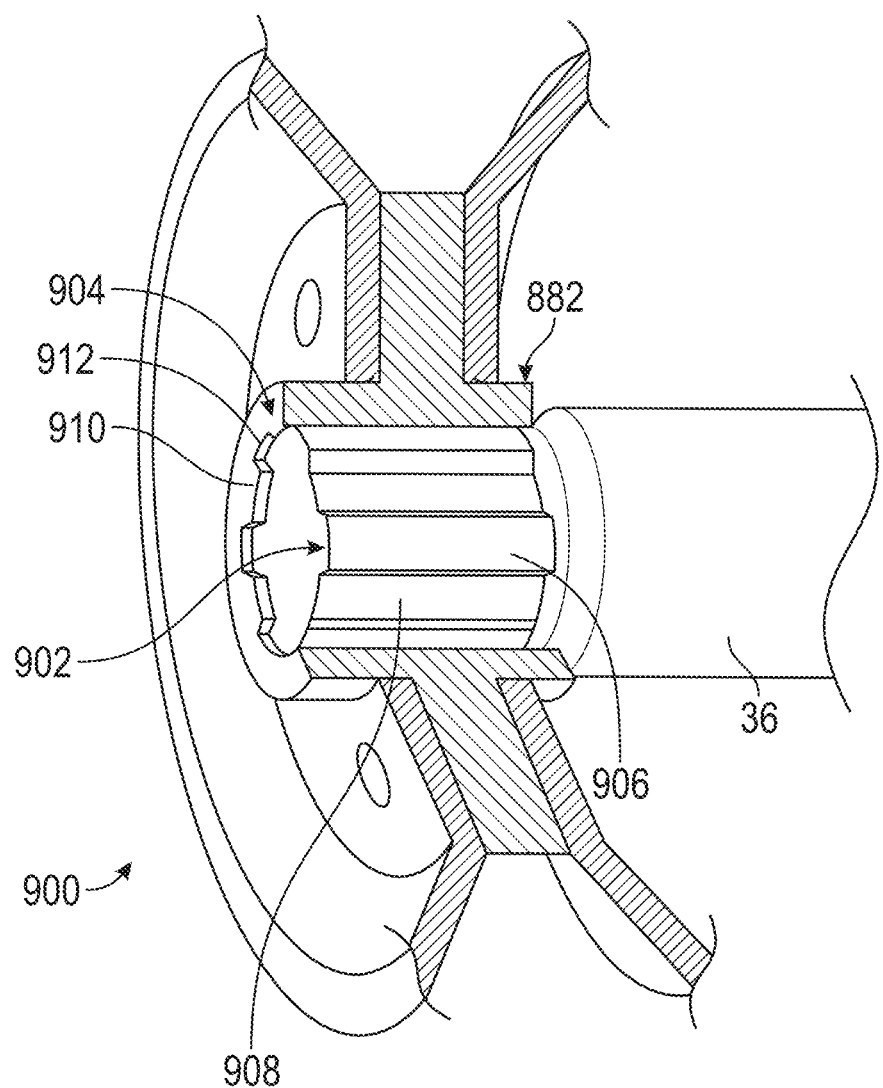
FIG. 9A illustrates a partial cross-sectional schematic view of a working spline connection for a connection device for coupling a sun gear of the gearbox assembly of FIG. 8 to an input shaft, according to the present disclosure.

FIG. 9A illustrates a partial cross-sectional schematic view of an exemplary spline connection 900 that may be employed to couple the shaft coupling member 882 to the LP shaft 36. The spline connection 900 may be a working spline. The spline connection 900 includes a first portion 902 on a radially outer surface of the LP shaft 36 that mates with a second portion 904 on a radially inner surface of the shaft coupling member 882. The first portion 902 includes a plurality of first portion protrusions 906 and a plurality of first portion slots 908 and the second portion 904 includes a plurality of second portion protrusions 910 and a plurality of second portion slots 912. The plurality of first portion protrusions 906 are received within and mate with the plurality of second portion slots 912 and the plurality of second portion protrusions 910 are received within and mate with the plurality of first portion slots 908. In this manner, the shaft coupling member 882 (and thus the connection device 876 and the sun gear 840) may axially move with respect to the LP shaft 36 while remaining rotationally coupled thereto. Although a plurality of slots and protrusions are depicted, more or fewer than shown may be provided. In one example, a single protrusion on one of the LP shaft 36 or the shaft coupling member 882 may be provided and a single slot in the other of the LP shaft 36 or the shaft coupling member 882 may be provided. The spline connection 900 is not limited to the particular structure, shape, and dimensions illustrated in FIG. 9A and other structure, shape, and dimensions are contemplated that allow for rotational coupling between the LP shaft 36 and the sun gear 840.

Figure 9B:
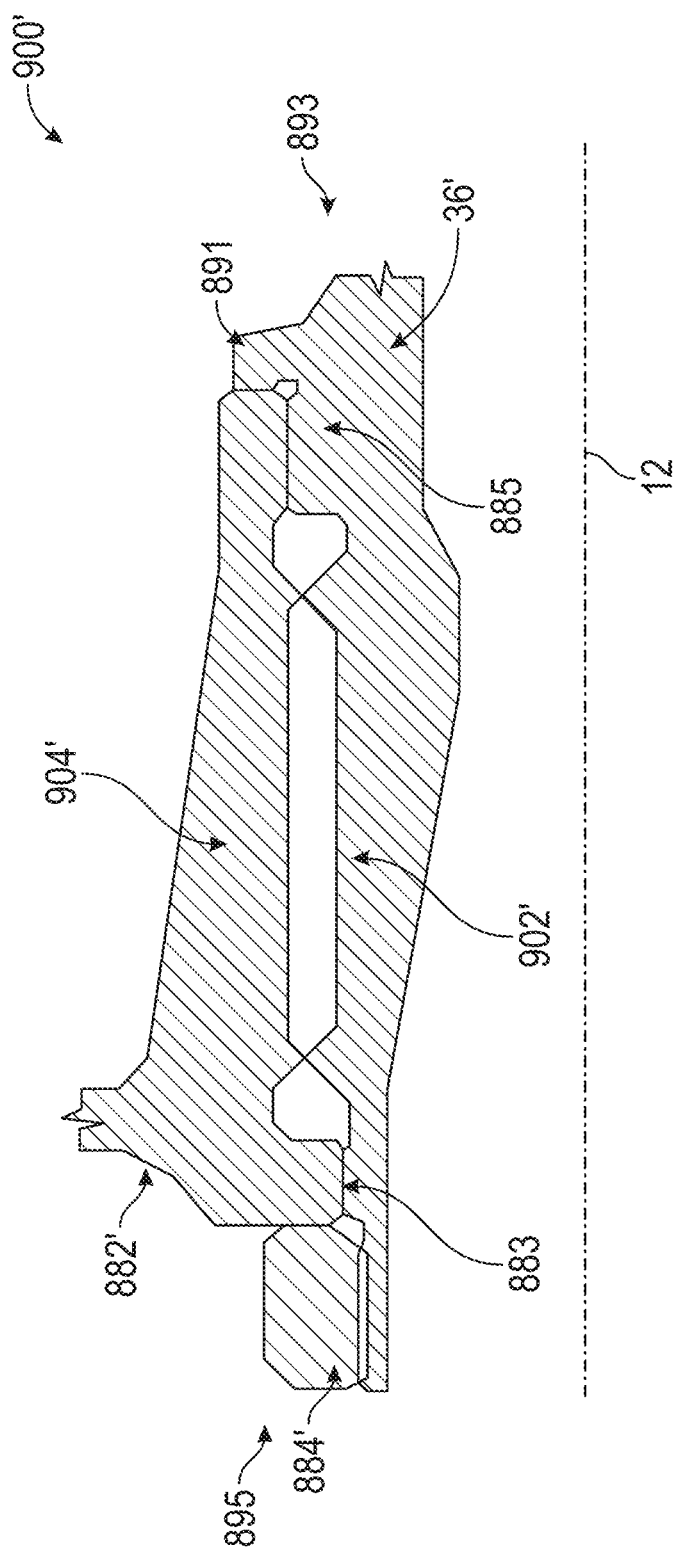
FIG. 9B illustrates a partial cross-sectional schematic view of a fixed spline connection for a connection device for coupling a sun gear of the gearbox assembly of FIG. 8 to an input shaft, according to the present disclosure.

FIG. 9B illustrates a partial cross-sectional schematic view, taken along the longitudinal centerline axis A, of another exemplary spline connection 900' that may be employed to couple an shaft coupling member 882' to an LP shaft 36'. The spline connection 900' may be a fixed spline. The spline connection 900' includes a male spline 902' on a radially outer surface of the LP shaft 36' that mates with a female spline 904' on a radially inner surface of the shaft coupling member 882'. A first press fit 883 may be located at a forward end 893 between the LP shaft 36' and the shaft coupling member 882'. A second press fit 885 may be located at an aft end 895 between the LP shaft 36' and the shaft coupling member 882'. The shaft coupling member 882' may abut and be adjacent to an aft shoulder 891 of the LP shaft 36' that limits the axial location of the shaft coupling member 882'. A fastening device 884' is secured to the LP shaft 36' at the forward end. Therefore, the aft shoulder 891, the fastening device 884', the first press fit 883, and the second press fit 885' maintain the shaft coupling member 882' and the LP shaft 36' at a predetermined axial relationship. The male spline 902' and the female spline 904' enable transfer of rotation from the LP shaft 36' to the shaft coupling member 882' and thus to the gears, as described previously with respect to FIG. 8.

Figure 10:
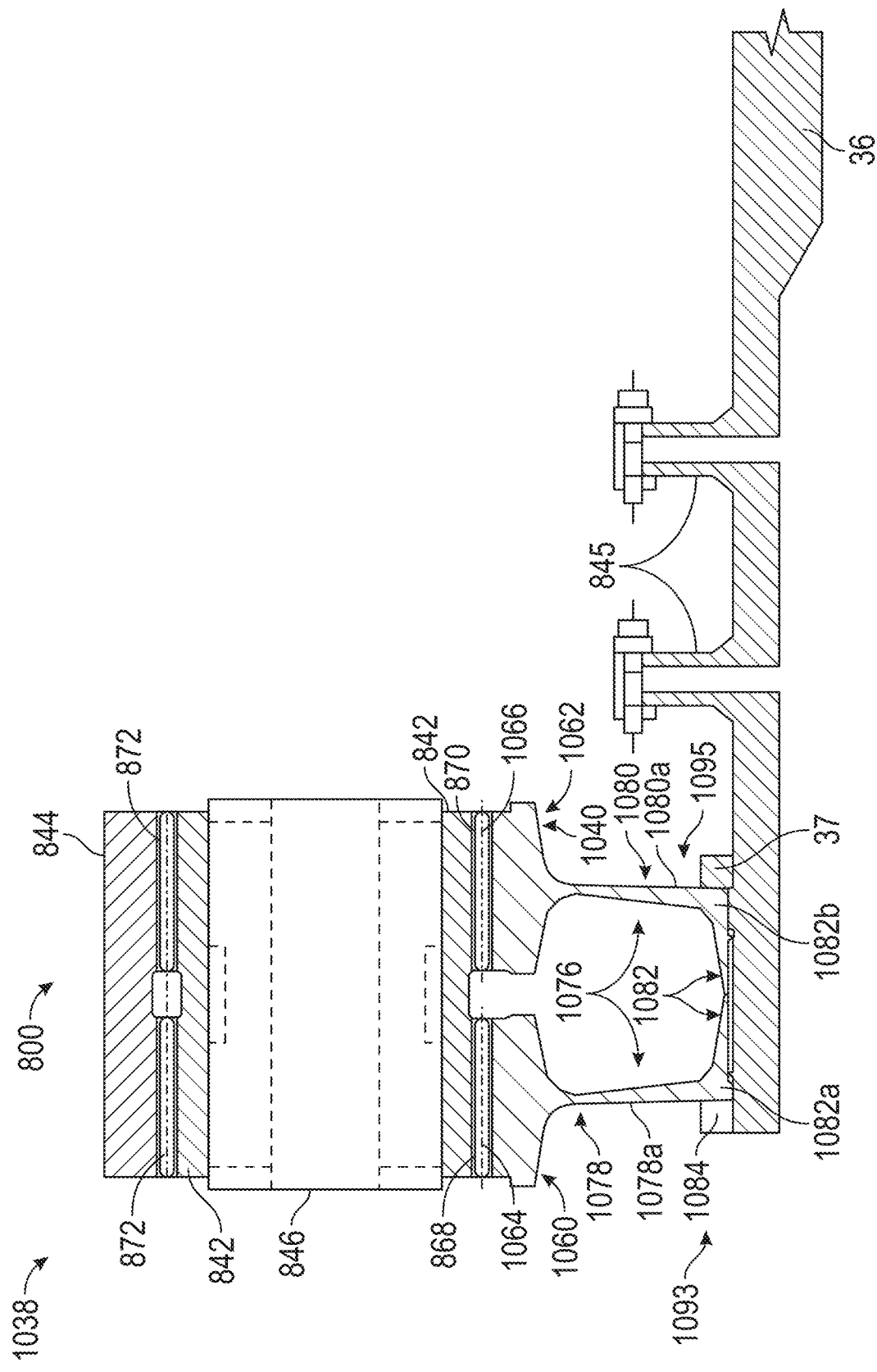
FIG. 10 shows a schematic, cross-sectional view of a gearbox assembly isolated from the gas turbine engine, taken along a centerline of the gas turbine engine, according to an embodiment of the present disclosure.

FIG. 10 illustrates a partial, cross-sectional view, taken along the longitudinal centerline axis A, of an exemplary gearbox assembly 1038 having a split sun gear 1040 that may be used with the gearbox assembly 838 of FIG. 8 in place of the sun gear 840. Accordingly, only the features that are different between the sun gear 840 and the sun gear 1040 are described. All other features are understood to be the same as, or substantially the same as, those described with respect to the sun gear 840.

The sun gear 1040 is a split sun gear 1040 having a forward sun gear 1060 and an aft sun gear 1062. The forward sun gear 1060 of the sun gear 1040 comprises a first set of sun gear teeth 1064 and the aft sun gear 1062 of the sun gear 1040 comprises a second set of sun gear teeth 1066. As with the sun gear 840, the sun gear 1040 is coupled to the LP shaft 36 with a connection device 1076. The connection device 1076 couples each of the forward sun gear 1060 and the aft sun gear 1062 to the LP shaft 36, but does not couple the forward sun gear 1060 to the aft sun gear 1062. The connection device 1076 includes a forward support member 1078, an aft support member 1080, a shaft coupling member 1082, and a fastening device 1084.

The forward support member 1078 includes a first portion 1078*a* that extends in the radial direction between the shaft coupling member 1082 and the forward sun gear 1060. The aft support member 1080 includes a first portion 1080*a* that extends in the radial direction between the shaft coupling member 1082 and the aft sun gear 1062.

The shaft coupling member 1082 includes a first portion 1082*a* and a second portion 1082*b* that each extends in an axial direction parallel to the LP shaft 36. The first portion 1082*a* rotationally couples the forward support member 1078 and, thus, the forward sun gear 1060 to the LP shaft 36 and the second portion 1082*b* couples the aft support member 1080 and, thus, the aft sun gear 1062 to the LP shaft 36. The first portion 1082*a* is integral with, or connected to, or coupled to the forward support member 1078 and the second portion 1082*b* is integral with, or connected to, or coupled to the aft support member 1080.

Both the first portion 882*a* and the second portion 882*b* are rotationally coupled to the LP shaft 36 such that rotation of the LP shaft 36 causes rotation of the sun gear 1040, in a manner that may be the same as, or similar to, the manner described with respect to FIGS. 8 and 9A to 9B. The forward fastening device 1084 extends at an axially forward end 1093 of the forward sun gear 1060 to prevent axial movement of the sun gear 1040 with respect to the LP shaft 36 in the forward direction. A shoulder 37 of the LP shaft 36 is located at an axially aft end 1095 of the aft sun gear 1062 to prevent axial movement of the sun gear 1040 with respect to the LP shaft 36 in the aft direction. Thus, the fastening device 1084 is secured such that the forward support member 1078, the aft support member 1080, and the shaft coupling member 1082 are axially fixed to the LP shaft 36. In this manner, the forward sun gear 1060 and the aft sun gear 1062 are rotationally coupled to the LP shaft 36 by way of the connection device 1076. The fastening device 1084 may be a plurality of fastening devices circumferentially spaced about the longitudinal centerline axis A (FIG. 1) or may be a single annular fastening device extending circumferentially about the longitudinal centerline axis A. As described herein, the fastening device 1084 may be a bolt, a screw, a weld, an anchor, a rivet, or other mechanical fastener.

The illustration of FIG. 10 is a cross-sectional view taken along the longitudinal centerline axis A of the gas turbine engine 10, with half of the sun gear 1040 omitted for simplicity. The sun gear 1040, however, extends circumferentially about the longitudinal centerline axis A such that the forward sun gear 1060, the aft sun gear 1062, the forward support member 1078, the aft support member 1080, and the shaft coupling member 1082 are each annular members.

Figure 11:
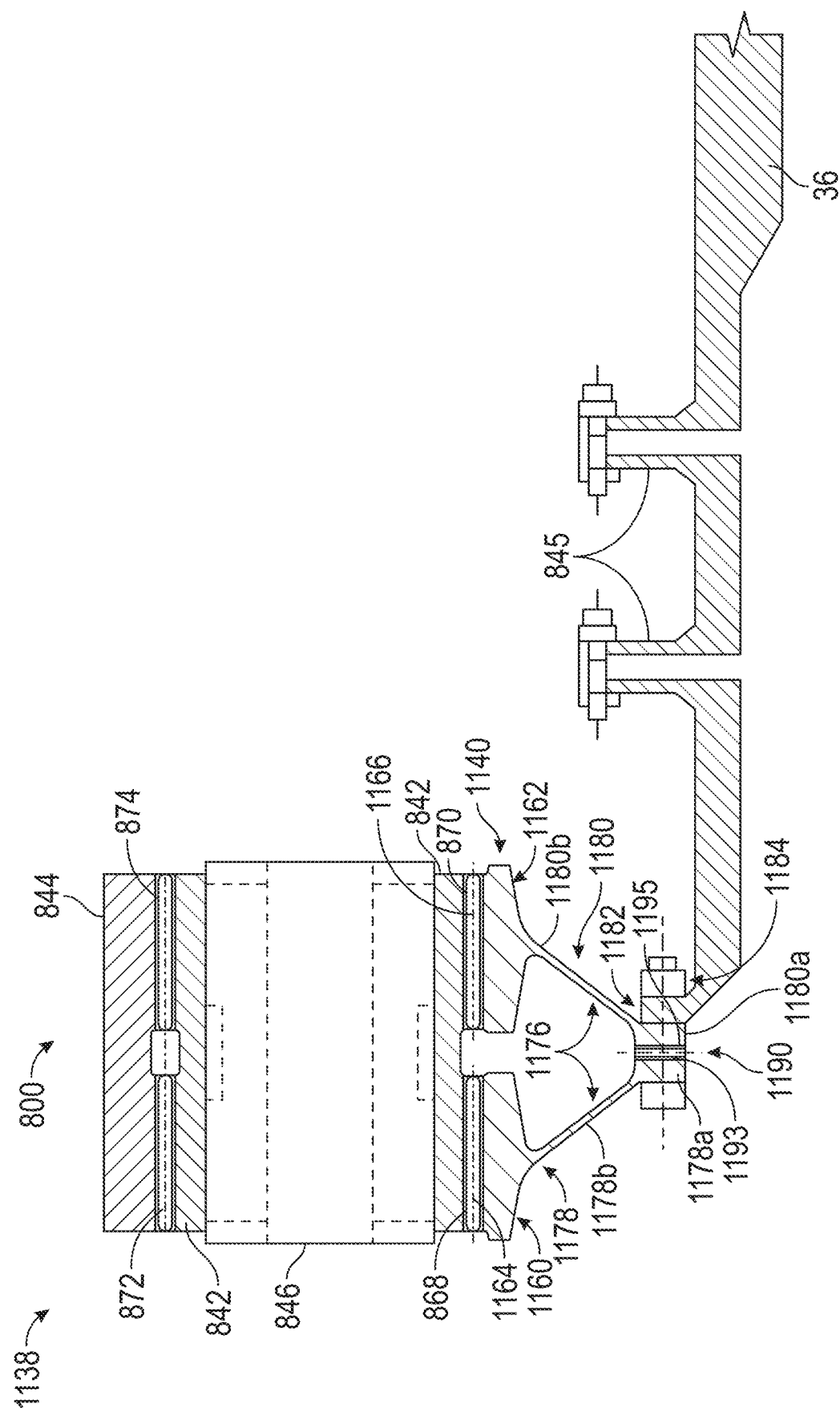
FIG. 11 shows a schematic, cross-sectional view of a gearbox assembly isolated from the gas turbine engine, taken along a centerline of the gas turbine engine, according to an embodiment of the present disclosure.

FIG. 11 illustrates a partial, cross-sectional view, taken along the longitudinal centerline axis A, of an exemplary gearbox assembly 1138 having a sun gear 1140 that may be used with the gearbox assembly 838 of FIG. 2 in place of the sun gear 840. Accordingly, only the features that are different between the sun gear 840 and the sun gear 1140 are described. All other features are understood to be the same as or substantially the same as those described with respect to the sun gear 840.

The sun gear 1140 is a split sun gear 1140 having a forward sun gear 1160 and an aft sun gear 1162. The forward sun gear 1160 of the sun gear 1140 comprises a first set of sun gear teeth 1164 and the aft sun gear 1162 of the sun gear 1140 comprises a second set of sun gear teeth 1166. As with the sun gear 840, the sun gear 1140 is coupled to the LP shaft 36 with a connection device 1176. The connection device 1176 couples the two separate components (e.g., the forward sun gear 1160 and the aft sun gear 1162) together and couples the sun gear 1140 to the LP shaft 36. The connection device 1176 includes a forward support member 1178, an aft support member 1180, a shaft coupling member 1182, and a fastening device 1184.

The forward support member 1178 includes a first portion 1178*a* and a second portion 1178*b*. The first portion 1178*a* extends in the radial direction and includes an opening therethrough (not visible) for receiving the fastening device 1184. The second portion 1178*b* extends at an angle between the first portion 1178*a* and the forward sun gear 1160.

The aft support member 1180 includes a first portion 1180*a* and a second portion 1180*b*. The first portion 1180*a* extends in the radial direction and includes an opening therethrough (not visible) for receiving the fastening device 1184. The second portion 1180*b* extends at an angle between the first portion 1180*a* and the aft sun gear 1162. The first portion 1180*a* of the aft sun gear 1162 is rotationally coupled to the first portion 1178*a* of the forward sun gear 1160 with a coupling 1190 such that rotation of the LP shaft 36 causes rotation of the first portion 1180*a*, which causes rotation of the first portion 1178*a*, and, therefore, rotation of the sun gear 1140. In the example of FIG. 11, the coupling 1190 is a curvic coupling, such as described in more detail with respect to FIG. 13.

The shaft coupling member 1182 extends in the radial direction on an aft side of and parallel to the first portion 1180*a* of the aft support member 1180. The shaft coupling member 1182 includes an opening therethrough (not visible) for receiving the fastening device 1184. The shaft coupling member 1182 may extend directly from the LP shaft 36. In some examples, the shaft coupling member 1182 is formed unitarily with the LP shaft 36. In some examples, the shaft coupling member 1182 is coupled to the LP shaft 36. The shaft coupling member 1182 is rotationally coupled to first portion 1180*a* of the aft sun gear 1162 such that rotation of the LP shaft 36 causes rotation of the first portion 1180*a* and, therefore, rotation of the sun gear 1140. In the example of FIG. 11, the first portion 1180*a* is rotationally coupled to the shaft coupling member 1182 through the connection of the fastening device 1184.

The fastening device 1184 extends through respective openings in the first portion 1178*a* of the forward support member 1178, the first portion 1180*a* of the aft support member 1180, and the shaft coupling member 1182. The fastening device 1184 is secured within the openings such that the forward support member 1178, the aft support member 1180, and the shaft coupling member 1182 are fixedly attached together. In this manner, the forward sun gear 1160 and the aft sun gear 1162 are rotationally coupled to the LP shaft 36 by way of the connection device 1176. Although the shaft coupling member 1182 is illustrated coupled to an axially aft side of the aft support member 1180, other locations are contemplated, such as, for example, an axially forward side of the aft support member 1180, an axially aft side of the forward support member 1178, or an axially forward side of the forward support member 1178.

The illustration of FIG. 11 is a cross-sectional view taken along the longitudinal centerline axis A of the gas turbine engine 10, with half of the sun gear 1140 omitted for simplicity. The sun gear 1140, however, extends circumferentially about the longitudinal centerline axis A such that the forward sun gear 1160, the aft sun gear 1162, the forward support member 1178, the aft support member 1180, and the shaft coupling member 1182 are each annular members. Accordingly, although a single fastening device 1184 is shown and a single opening in each of the first portions 1178a, 1180a, and the shaft coupling member 1182 are described, a plurality of openings may be provided in a circumferentially spaced manner about the longitudinal centerline axis A to secure the sun gear 1140 to the LP shaft 36.

Figure 12:
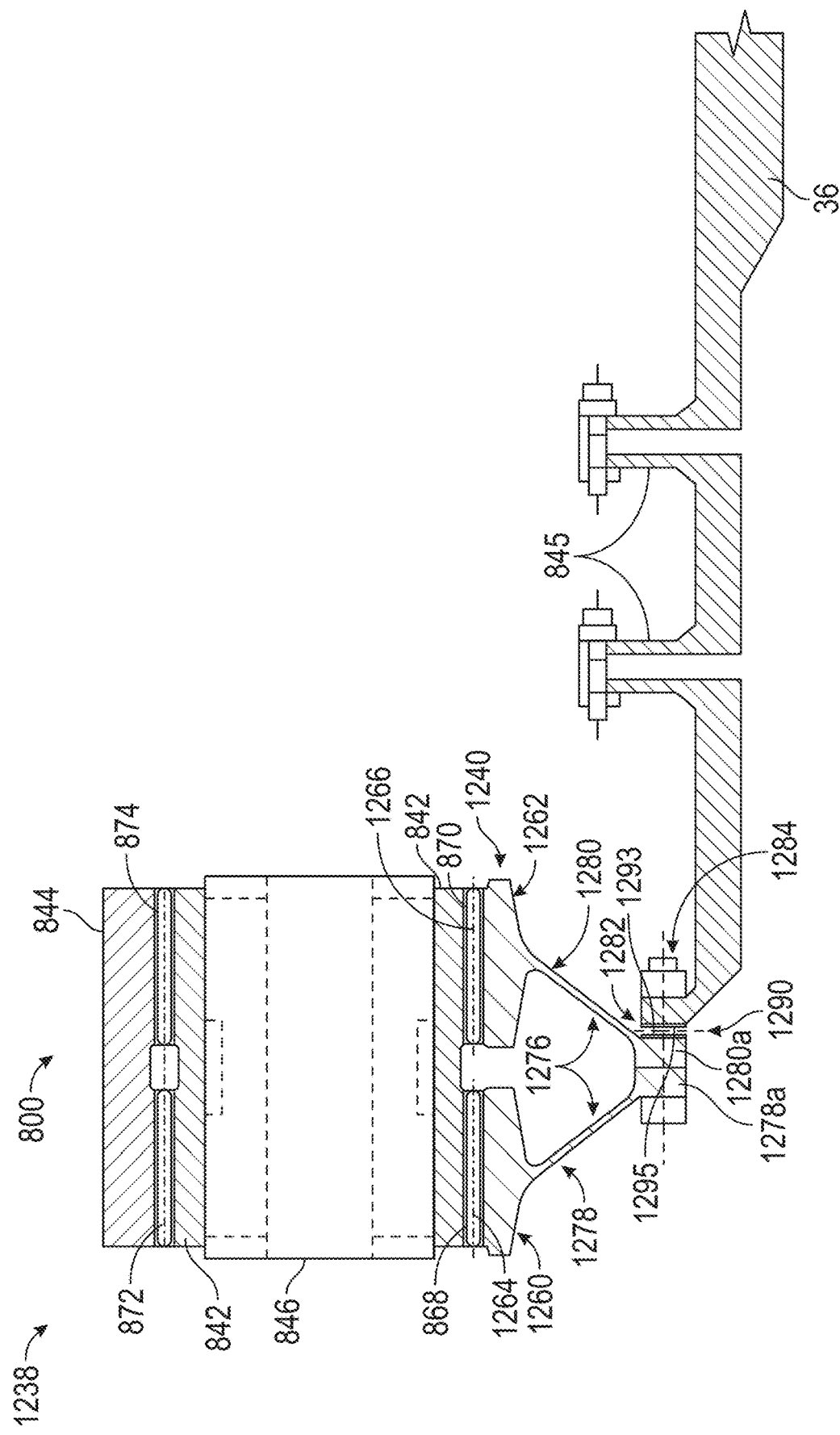
FIG. 12 shows a schematic, cross-sectional view of a gearbox assembly isolated from the gas turbine engine, taken along a centerline of the gas turbine engine, according to an embodiment of the present disclosure.

FIG. 12 illustrates a partial, cross-sectional view, taken along the longitudinal centerline axis A, of an exemplary gearbox assembly 1238 having a sun gear 1240 that may be used with the gearbox assembly 838 of FIG. 8 in place of the sun gear 840. The sun gear 1240 is similar to the sun gear 1140 described with respect to FIG. 11 except for the location of the curvic coupling. Accordingly, only the features that are different between the sun gear 1140 and the sun gear 1240 are described. All other features are understood to be the same as or substantially the same as those described with respect to the sun gear 1140.

The sun gear 1240 is a split sun gear 1240 having a forward sun gear 1260 and an aft sun gear 1262. The forward sun gear 1260 of the sun gear 1240 comprises a first set of sun gear teeth 1264 and the aft sun gear 1262 of the sun gear 1240 comprises a second set of sun gear teeth 1266. The sun gear 1240 is coupled to the LP shaft 36 with a connection device 1276. The connection device 1276 couples the two separate components (e.g., the forward sun gear 1260 and the aft sun gear 1262) together and couples the sun gear 1240 to the LP shaft 36. The connection device 1276 includes a forward support member 1278, an aft support member 1280, a shaft coupling member 1282, and a fastening device 1284.

In FIG. 11, the forward sun gear 1160 is coupled to the aft sun gear 1162 with the coupling 1190 between an aft surface 1193 of the first portion 1178a and a forward surface 1195 of the first portion 1180a. In FIG. 12, however, an aft surface of the first portion 1278a simply abuts a forward surface of the first portion 1280a with no coupling 1190 therebetween. Instead, a coupling 1290 is provided between an aft surface 1293 of the first portion 1280a and a forward surface 1295 of the shaft coupling member 1282. The coupling 1290 may be a curvic coupling such as described with respect to FIG. 13. Therefore, rotation of the LP shaft 36 causes rotation of the sun gear 1240 as described previously.

Figure 13:
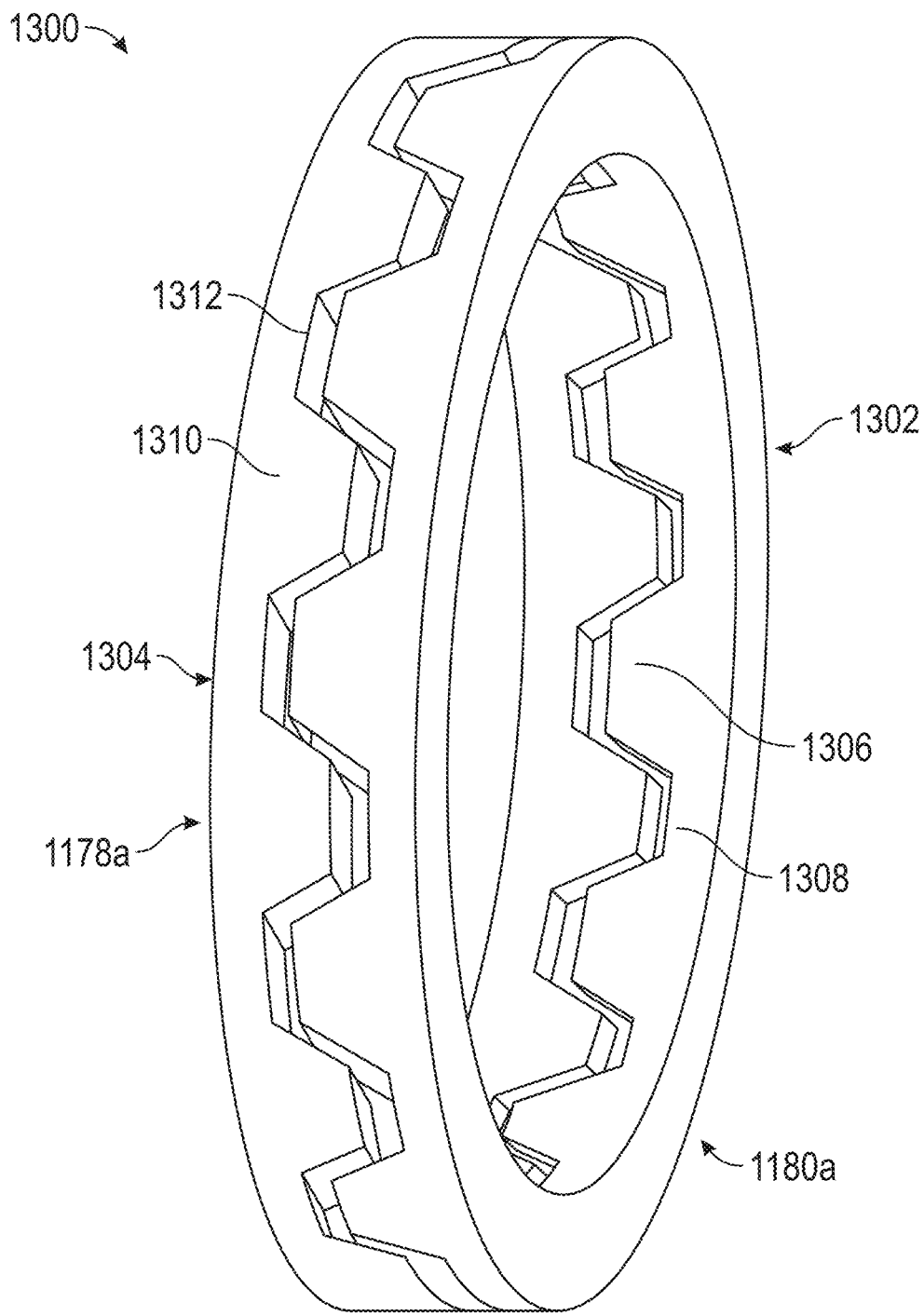
FIG. 13 illustrates a partial schematic view of a curvic connection for a connection device for coupling a sun gear of the gearbox assembly of FIGS. 11 and 12 to an input shaft, according to the present disclosure.

FIG. 13 illustrates a partial view of an exemplary curvic connection 1300 that may be employed to couple the first portion 1178a of the forward support member 1178 and the first portion 1180a of the aft support member 1180 (FIG. 11). The first portion 1178a and the first portion 1180a are illustrated simply as cylinders in FIG. 13 solely to facilitate understanding of the curvic connection 1300. The first portion 1178a and the first portion 1180a are arranged, however, as shown and described with respect to FIG. 11. Likewise, when the curvic connection 1300 is employed in the sun gear 1240 of FIG. 12, the first portion 1178a shown in FIG. 13 may be the first portion 1280a of FIG. 12 and the first portion 1180a shown in FIG. 13 may be the shaft coupling member 1282 shown in FIG. 13.

The curvic connection 1300 of FIG. 13 operates the same in FIGS. 11 and 12, only the location of the coupling is different. Therefore, the following description refers to FIG. 11 only for simplicity, but similar arrangement is understood to be present between the first portion 1280a and the shaft coupling member 1282. The curvic connection 1300 includes a first portion 1302 on an axial surface (in the embodiment of FIG. 11, an axially forward facing surface) of the first portion 1180a and a second portion 1304 on an axial surface (in the embodiment of FIG. 11, an axially aft facing surface) of the first portion 1178a. The first portion 1302 includes a plurality of first portion protrusions 1306 and a plurality of first portion slots 1308, and the second portion 1304 includes a plurality of second portion protrusions 1310 and a plurality of second portion slots 1312. The plurality of first portion protrusions 1306 are received within and mate with the plurality of second portion slots 1312 and the plurality of second portion protrusions 1310 are received within and mate with the plurality of first portion slots 1308. Although a plurality of slots and protrusions are depicted, more or fewer than shown may be provided. The curvic connection 1300 is not limited to the particular structure, shape, and dimensions illustrated in FIG. 13. Rather, other structures, shapes, and dimensions are contemplated that allow for rotational coupling between the LP shaft 36 and the sun gear 1140.

Figure 14:
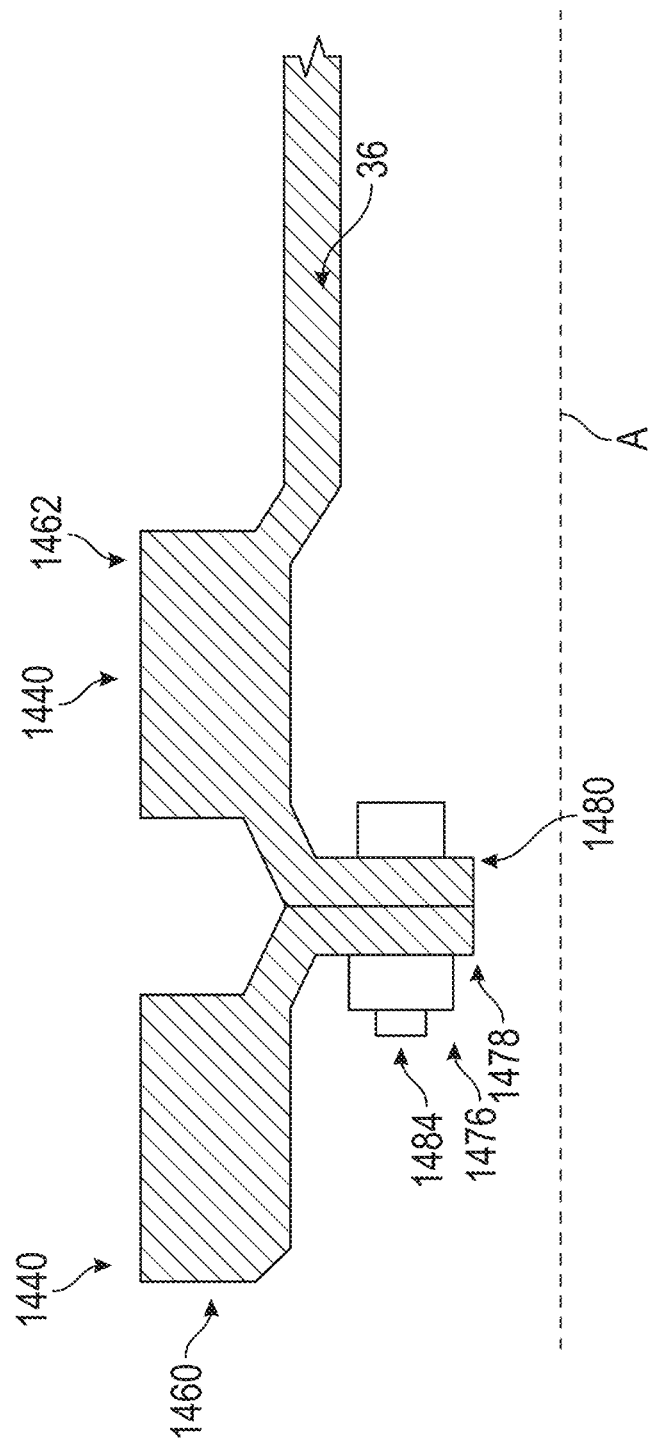
FIG. 14 shows a schematic, cross-sectional view of a gearbox assembly isolated from the gas turbine engine, taken along a centerline of the gas turbine engine, according to an embodiment of the present disclosure.

FIG. 14 illustrates a partial, cross-sectional view, taken along the longitudinal centerline axis A, of an exemplary sun gear 1440 that may be used with the gearbox assembly 838 of FIG. 8 in place of the sun gear 840. Accordingly, only the features that are different between the sun gear 840 and the sun gear 1440 are described. All other features are understood to be the same as or substantially the same as those described with respect to the sun gear 840. The sun gear 1440 is a split sun gear 1440.

The sun gear 1440 includes a forward sun gear 1460 and an aft sun gear 1462. The sun gear teeth are not shown in the view of FIG. 14. The aft sun gear 1462 is formed integrally and unitarily with LP shaft 36. Thus, rotation of the LP shaft 36 rotates the aft sun gear 1462. The forward sun gear 1460 is coupled to the aft sun gear 1462 with a connection device 1476. The connection device 1476 includes a forward support member 1478 and an aft support member 1480. The forward support member 1478 and the aft support member 1480 are coupled together with a fastening device 1484. Thus, rotation of the aft sun gear 1462 (due to rotation of the integrally formed LP shaft 36) rotates the forward sun gear 1460 due to the connection device 1476.

Figure 15:
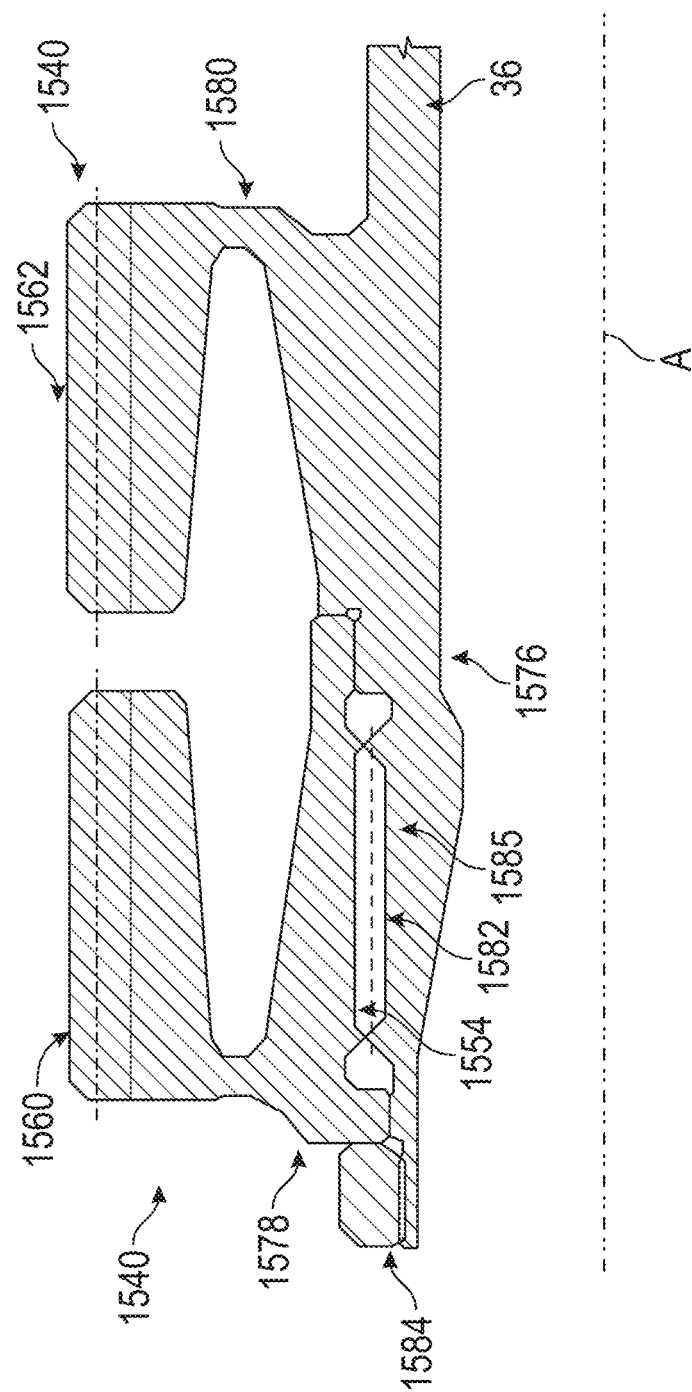
FIG. 15 shows a schematic, cross-sectional view of a gearbox assembly isolated from the gas turbine engine, taken along a centerline of the gas turbine engine, according to an embodiment of the present disclosure.

FIG. 15 illustrates a partial, cross-sectional view of an exemplary sun gear 1540 that may be used with the gearbox assembly 838 of FIG. 8 in place of the sun gear 840. Accordingly, only the features that are different between the sun gear 840 and the sun gear 1540 are described. All other features are understood to be the same as or substantially the same as those described with respect to the sun gear 840. The sun gear 1540 is a split sun gear 1540.

The sun gear 1540 includes a forward sun gear 1560 and an aft sun gear 1562. The sun gear teeth are not shown in the view of FIG. 15. The aft sun gear 1562 is formed integrally and unitarily with the LP shaft 36. An aft support member 1580 supports the aft sun gear 1562 on the LP shaft 36. Thus, rotation of the LP shaft 36 rotates the aft sun gear 1562. The LP shaft 36 includes a shaft coupling member 1582. The forward sun gear 1560 is coupled to the shaft coupling member 1582 with a connection device 1576. The connection device 1576 includes a male spline 1585 on the shaft coupling member 1582 and female splines 1554 on the forward sun gear 1560 and is thus a fixed spline as in FIG. 3B. The connection device 1576 allows rotational coupling between the LP shaft 36 and the forward sun gear 1560. A forward support member 1578 supports the forward sun gear 1560 with respect to the female splines 1554. A fastening device 1584 secures the forward sun gear 1560 to the LP shaft 36.

FIGS. 14 and 15 illustrate exemplary sun gears that combine various features from other embodiments. For example, FIG. 15 combines the integral aft sun gear of FIG. 14 with the fixed spline of FIG. 12. Thus, any portion of the aforementioned embodiments may be combined with any other portion so long as the resulting combination is a split sun gear that rotates with the input shaft.

Figure 16:
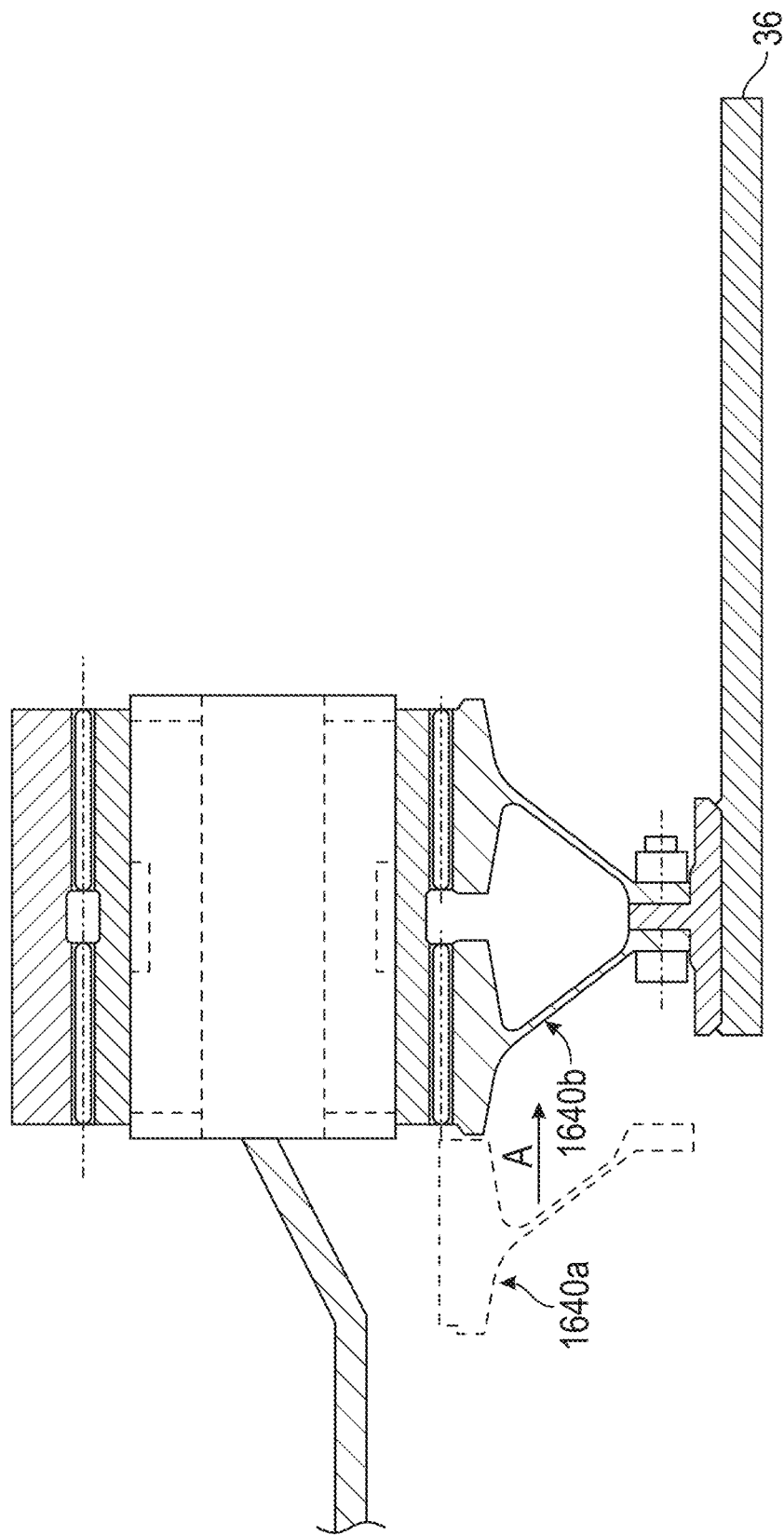
FIG. 16 illustrates a schematic cross-sectional view to show installation of a sun gear onto an input shaft, according to the present disclosure.

FIG. 16 illustrates a schematic, cross-sectional view to show a portion of an installation process for a split sun gear, such as a split sun gear 840, 1040, 1140, 1240, 1440, and 1540 as described herein. During installation of any of the split sun gears described herein, the aft sun gear (e.g., the aft sun gears 862, 1062, 1162, 1262, 1462, 1562) is moved longitudinally in the axial direction A over a forward end of the LP shaft 36.

In the example of the sun gear 840, and referring to FIGS. 8 and 16, the aft sun gear 862 is moved longitudinally in the axial direction A over the forward end of the LP shaft 36. The shaft coupling member 882 is moved longitudinally in the axial direction A over the forward end of the LP shaft 36 to a location adjacent to the aft sun gear 862. After the shaft coupling member 882 is installed, the forward sun gear 860 is moved longitudinally in the axial direction A over the forward end of the LP shaft 36. The longitudinal motion of the components in the axial direction A is illustrated by the movement of the forward sun gear from the position 1640*a* to the position 1640*b* in FIG. 16. The fastening device 884 may then be secured, through the respective openings. In installing the sun gear 840, the protrusions and the slots of the spline connection are aligned when installing the shaft coupling member 882 to ensure proper operation and proper rotational coupling of the LP shaft 36 and the sun gear 840.

Figure 17:
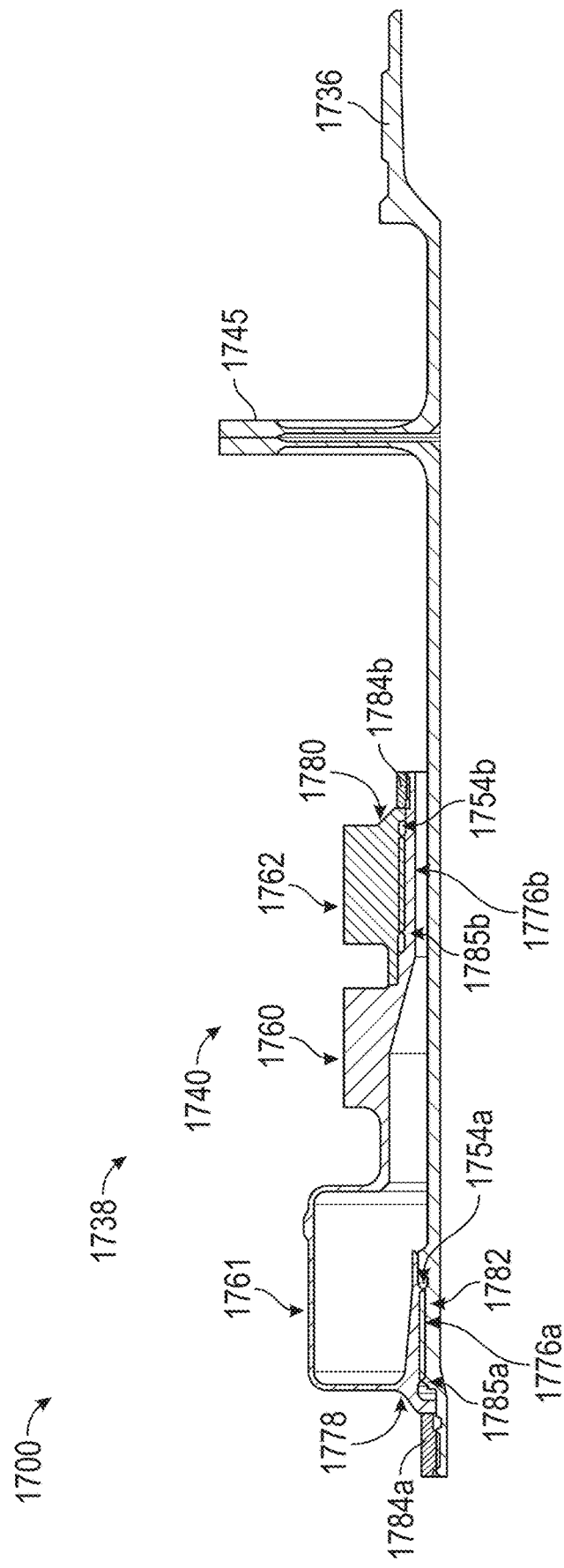
FIG. 17 shows a schematic, cross-sectional view of a gearbox assembly isolated from the gas turbine engine, taken along a centerline of the gas turbine engine, according to an embodiment of the present disclosure.

FIG. 17 illustrates a partial, cross-sectional view of a gearbox assembly 1738 with a mounting assembly 1700, according to an embodiment of the present disclosure. For clarity, only a sun gear 1740 of the gearbox assembly 1738 is shown, but the gearbox assembly 1738 can also include a plurality of planet gears and a ring gear. The mounting assembly 1700 includes a flex coupling 1745. The mounting assembly 1700 can also include a flex mount (not shown) and a fan frame (not shown). The flex coupling 1745 includes a single flex coupling on an LP shaft 1736.

The sun gear 1740 that may be used with the gearbox assembly 838 of FIG. 8 in place of the sun gear 840. Accordingly, only the features that are different between the sun gear 840 and the sun gear 1740 are described. All other features are understood to be the same as or substantially the same as those described with respect to the sun gear 840. The sun gear 1740 is a split sun gear 1740.

The sun gear 1740 includes a forward sun gear 1760 and an aft sun gear 1762. The sun gear teeth are not shown in the view of FIG. 17. The LP shaft 1736 includes a shaft coupling member 1782. The forward sun gear 1760 includes a flex sun gear portion 1761. In this way, the flex sun gear portion 1761 functions similar as to the flex coupling 1745. The forward sun gear 1760 is coupled to the shaft coupling member 1782 at the flex sun gear portion 1761 with a forward connection device 1776*a*. The forward connection device 1776*a* includes a forward male spline 1785*a* on the shaft coupling member 1782 and forward female splines 1754*a* on the flex sun gear portion 1761 of the forward sun gear 1760 and is thus a fixed spline as in FIG. 9B. The forward connection device 1776*a* allows rotational coupling between the LP shaft 1736 and the forward sun gear 1760. A forward support member 1778 supports the forward sun gear 1760 with respect to the forward female splines 1754*a*. A forward fastening device 1784*a* secures the forward sun gear 1760 to the LP shaft 1736.

The aft sun gear 1762 is coupled to the forward sun gear 1760 with an aft connection device 1776*b*. The aft connection device 1776*b* includes an aft male spline 1785*b* on the forward sun gear 1760 and aft female splines 1754*b* on the aft sun gear 1762 and is thus a fixed spline as in FIG. 9B. The aft connection device 1776*b* allows rotational coupling between the forward sun gear 1760 and the aft sun gear 1762. An aft support member 1780 supports the aft sun gear 1762 with respect to the aft female splines 1754*b*. An aft fastening device 1784*b* secures the aft sun gear 1762 to the forward sun gear 1760.

When developing a gas turbine engine, the interplay among components can make it particularly difficult to select or to develop one component during engine design and prototype testing, especially, when some components are at different stages of completion. For example, one or more components may be nearly complete, yet one or more other components may be in an initial or a preliminary phase, such that only one (or a few) design parameters are known. It is desired to arrive at what is possible at an early stage of design, so that the down selection of candidate optimal designs, given the tradeoffs, become more possible. Heretofore, the process has sometimes been more ad hoc, selecting one design or another without knowing the impact when a concept is first taken into consideration. For example, and referring to FIG. 1, various aspects of the fan 14 design, the nacelle 30 design, the casing 17 design, the engine static structure 19 design, the high-pressure shaft 39 design, or the low-pressure shaft 36 design may not be known, but such components impact the bending experienced by the gas turbine engine 10 and, thus, may influence the design of the mounting assembly of the gearbox assembly 38.

There is a desire to narrow the range of configurations or combination of features that can yield favorable results given the constraints of the design, feasibility, manufacturing, certification requirements, etc., early in the design selection process to avoid wasted time and effort, in addition to improving upon the types of mounting that are optimal for gearbox longevity and better suited to satisfy mission requirements. During the course of the evaluation of different embodiments as set forth above, the inventors, discovered, unexpectedly, that there exists a relationship between the stiffness of a mounting component and the damping of a mounting component, which uniquely identifies a finite and readily ascertainable (in view of this disclosure) number of embodiments suitable for a particular architecture that addresses the movement of the gears due to the loading on the engine casing. This was found to enable a better system of mounting components, more optimal to the mechanical system, compared to existing methods. The relationship defined is the dynamic stiffness that accounts for both the static and the dynamic aspects of the mechanical system (e.g., the moving gears, the static mountings, the casing, etc.). The dynamic stiffness relationship is referred to by the inventors as an Impedance Parameter (Z), and is defined according to the following relationship (1) between the structural stiffness K and the equivalent damping coefficient, also referred to as viscous damping coefficient, C:

$$\text{Impedance Parameter } (Z) = K * C \quad (1)$$

As discussed above, each of the mounting components experiences movement in three degrees of freedom: lateral, bending, and torsional. Thus, each component includes a dynamic stiffness or an Impedance Parameter for each degree of freedom. That is, each component has a lateral Impedance Parameter ($Z^L$), a bending Impedance Parameter ($Z^B$), and a torsional Impedance Parameter ($Z^T$), as defined according to the following relationships (2) to (10), where "L" refers to "lateral," "B" refers to "bending," "T" refers to "torsional," "fm" refers to "flex mount," "ff" refers to "fan frame," and "fc" refers to "flex coupling":

$$\text{Impedance Parameter } (Z_{fm}^L) = K_{fm}^L * C_{fm}^L \quad (2)$$

$$\text{Impedance Parameter } (Z_{fm}^B) = K_{fm}^B * C_{fm}^B \quad (3)$$

$$\text{Impedance Parameter } (Z_{fm}^T) = K_{fm}^T * C_{fm}^T \quad (4)$$

$$\text{Impedance Parameter } (Z_{ff}^L) = K_{ff}^L * C_{ff}^L \quad (5)$$

$$\text{Impedance Parameter } (Z_{ff}^B) = K_{ff}^B * C_{ff}^B \quad (6)$$

$$\text{Impedance Parameter } (Z_{ff}^T) = K_{ff}^T * C_{ff}^T \quad (7)$$

$$\text{Impedance Parameter } (Z_{fc}^L) = K_{fc}^L * C_{fc}^L \quad (8)$$

$$\text{Impedance Parameter } (Z_{fc}^B) = K_{fc}^B * C_{fc}^B \quad (9)$$

$$\text{Impedance Parameter } (Z_{fc}^T) = K_{fc}^T * C_{fc}^T \quad (10)$$

Thus, referring back to FIGS. 2 to 5, relationships (2), (3), and (4) define Impedance Parameters for the flex mount 147 and the flex mount 247; relationships (5), (6), and (7) define Impedance Parameters for the fan frame 149 and the fan frame 249; and relationships (8), (9), and (10) define Impedance Parameters for the flex coupling 145 and the flex coupling 245.

The mounting components described in the present disclosure do not have a true viscous damping coefficient, but instead possess structural damping, also referred to as hysteretic damping. Hysteretic damping varies directly with the magnitude of displacement and may be defined by the relationship (11):

$$\text{Damping } (C) = \frac{h}{\omega} \quad (11)$$

where "h" is the hysteretic damping coefficient and w is the frequency of vibration. Thus, at lower vibrations the hysteretic damping tends to be greater, consistent with the magnitude of displacement expected at lower (vs. higher) vibrational frequencies. The hysteretic damping is further defined by the structural stiffness and the loss factor as shown in relationship (12).

$$\text{Hysteretic Coefficient } (h) = K * \eta \quad (12)$$

where "K" is the structural stiffness and n is the loss factor. The loss factor is defined by the material of the component. Some exemplary loss factors are shown in Table 1.

TABLE 1

| Material | Loss Factor (η) |
|---|---|
| Aluminum | 0.3 to 10 (×10⁻⁵) |
| Lead (pure) | 5 to 30 (×10⁻²) |
| Lead (with antimony) | 1 to 4 (×10⁻²) |
| Iron | 1 to 4 (×10⁻⁴⁻) |
| Steel | 0.2 to 3 (×10⁻⁴) |

Relationship (12) may be inserted into relationship (11) to define relationship (13):

$$\text{Damping } (C) = \frac{K * \eta}{\omega} \quad (13)$$

Relationship (13) may be inserted into relationship (1) to define relationship (14):

$$\text{Impedance Parameter } (Z) = \frac{K^2 * \eta}{\omega} \quad (14)$$

Therefore, as discussed above, each of the mounting components may have an impedance parameter defined according to the following relationships (15) to (23):

$$\text{Impedance Parameter } (Z_{fm}^L) = \frac{(K_{fm}^L)^2 * \eta}{\omega} \quad (15)$$

$$\text{Impedance Parameter } (Z_{fm}^B) = \frac{(K_{fm}^B)^2 * \eta}{\omega} \quad (16)$$

$$\text{Impedance Parameter } (Z_{fm}^T) = \frac{(K_{fm}^T)^2 * \eta}{\omega} \quad (17)$$

$$\text{Impedance Parameter } (Z_{ff}^L) = \frac{(K_{ff}^L)^2 * \eta}{\omega} \quad (18)$$

$$\text{Impedance Parameter } (Z_{ff}^B) = \frac{(K_{ff}^B)^2 * \eta}{\omega} \quad (19)$$

$$\text{Impedance Parameter } (Z_{ff}^T) = \frac{(K_{ff}^T)^2 * \eta}{\omega} \quad (20)$$

$$\text{Impedance Parameter } (Z_{fc}^L) = \frac{(K_{fc}^L)^2 * \eta}{\omega} \quad (21)$$

$$\text{Impedance Parameter } (Z_{fc}^B) = \frac{(K_{fc}^B)^2 * \eta}{\omega} \quad (22)$$

$$\text{Impedance Parameter } (Z_{fc}^T) = \frac{(K_{fc}^T)^2 * \eta}{\omega} \quad (23)$$

Thus, referring back to FIGS. 2 to 5, relationships (15), (16), and (17) define Impedance Parameters for the flex mount 147 and the flex mount 247; relationships (18), (19), and (20) define Impedance Parameters for the fan frame 149 and the fan frame 249; and relationships (21), (22), and (23) define Impedance Parameters for the flex coupling 145 and the flex coupling 245.

The inventors, further discovered, during the course of optimization of, and in consideration of the different loading environments for a gearbox and associated mission requirements, that a ratio of impedance parameters provided insights on the selection of more optimal gearbox supporting components to use, versus choosing a component design without fully accounting or appreciating for the structural coupling between the components. The ratio can account for the effect that properties of one component may have on another in supporting a gearbox. The Impedance Parameter Ratio (IPR) is expressed according to relationships (24) to (29):

$$IPR^L_{fm/ff} = \frac{Z^L_{fm}}{Z^L_{ff}} \qquad (24)$$

$$IPR^B_{fm/ff} = \frac{Z^B_{fm}}{Z^B_{ff}} \qquad (25)$$

$$IPR^T_{fm/ff} = \frac{Z^T_{fm}}{Z^T_{ff}} \qquad (26)$$

$$IPR^L_{fc/ff} = \frac{Z^L_{fc}}{Z^L_{ff}} \qquad (27)$$

$$IPR^B_{fc/ff} = \frac{Z^B_{fc}}{Z^B_{ff}} \qquad (28)$$

$$IPR^T_{fc/ff} = \frac{Z^T_{fc}}{Z^T_{ff}} \qquad (29)$$

where relationships (24) to (26) define an IPR of the flex mount with respect to the fan frame and relationships (27) to (29) define an IPR of the flex coupling with respect to the fan frame.

The ratio of Impedance Parameters for the lateral stiffness and the bending stiffness is preferably designed to be low as compared to the fan frame. This allows the gears to move more easily together, while retaining uniform loading and reducing edge loading on gears. For example, as shown in the embodiments 1 and 2 to follow, the stiffness K of the fan frame is selected and predetermined as set forth in Table 2. The stiffness of the flex mount and the flex coupling is defined by the relationships herein, as described with respect to the embodiments to follow.

Unlike the lateral stiffness and the bending stiffness Impedance Parameter ratios, ratios for torsional stiffness are designed to be relatively high compared to the fan frame. Highly flexible torsional stiffness values for the flex coupling and the flex mount are undesirable as that leads to high stresses and introduce unwanted vibration modes into the system.

The present disclosure defines an Impedance Parameter Ratio of the three main gearbox assembly-engine interfaces (e.g., the fan frame, the flex coupling, and the flex mount). The design parameter not only accounts for stiffness, but also accounts for structural hysteresis in the form of equivalent viscous damping. The three main elements that interface the gearbox assembly are (1) the fan shaft with stiff connection to the fan frame, (2) the flex mount, and (3) the flex coupling from the input shaft. The magnitude of the ratio of Impedance Parameters is preferably made relative to the fan frame impedance as this was found to provide the most convenient indicator of relative impedance for choosing an optimal design.

The Impedance Parameter was found to be unique for two main reasons, as alluded to earlier. First, the Impedance Parameter not only accounts for structural stiffness (K), but, also for damping (C). This allows the Impedance Parameter to account for the dynamics of the mechanical system in addition to the static performance or integrity of the mechanical system. The stiffness addresses static loads and operating conditions and the damping addresses dynamic scenarios, for example, under rotation and inflight maneuvers. Second, in addition to the lateral and the rotational or the bending stiffness, the Impedance Parameter defines desirable design choices for torsional stiffness as well.

As discussed further below, the inventors have identified a range of the Impedance Parameter for each of the mounting components, with respect to one another, that enable a mounting assembly 100, 200, 300, and 800 design such that gears of the gearbox assembly 38 are best able to maintain alignment during engine loading conditions (e.g., take off and climb). As mentioned, the lateral stiffness and the bending stiffness of each of the flex mount and the flex coupling are lower than the respective lateral stiffness and the bending stiffness of the fan frame. The ratio of the Impedance Parameter of the flex mount with respect to the fan frame for the lateral stiffness and the bending stiffness (e.g., the lateral IPR of relationship (24) and the bending IPR of relationship (25)) is less than or equal to 0.5. In some examples, the ratio is less than or equal to 0.4. In some examples, the ratio is between 0.1 and 0.5. In some examples, the ratio is between 0.1 and 0.4. In some examples, the ratio is between 0.1 and 0.5. In some examples, the ratio is between 0.1 and 0.4. In some examples, the ratio is between 0.2 and 0.5. In some examples, the ratio is between 0.3 and 0.4. In some examples, the ratio is 0.1, 0.2, 0.3, 0.4, 0.5, or any discrete value between 0.1 and 0.5.

The ratio of the Impedance Parameter of the flex coupling with respect to the fan frame for the lateral stiffness and the bending stiffness (e.g., the lateral IPR of relationship (27) and the bending IPR of relationship (28)) is less than or equal to 0.5. In some examples, the ratio is less than or equal to 0.4. In some examples, the ratio is between 0.1 and 0.5. In some examples, the ratio is between 0.01 and 0.4. In some examples, the ratio is between 0.1 and 0.5. In some examples, the ratio is between 0.1 and 0.4. In some examples, the ratio is between 0.02 and 0.5. In some examples, the ratio is between 0.3 and 0.4. In some examples, the ratio is 0.1, 0.2, 0.3, 0.4, 0.5, or any discrete value between 0.1 and 0.5.

The torsional stiffness of each of the flex mount and the flex coupling is closer to the torsional stiffness of the fan frame. The ratio of the Impedance Parameter of the flex mount with respect to the fan frame and the flex coupling with respect to the fan frame for the torsional stiffness (e.g., the IPR of relationships (26) and (29)) is greater than or equal to 0.1. In some examples, the ratio is greater than or equal to 0.4. In some examples, the ratio is between 0.1 and 0.95. In some examples, the ratio is between 0.4 and 0.95.

Tables 2 to 5 describe exemplary embodiments 1 and 2 identifying the Impedance Parameter for two engine types. The exemplary engines of embodiments 1 and 2 may be turbofan engines. The exemplary engines of embodiments 1 and 2 may be employed with narrow body airframes or wide body airframes. The exemplary engines of embodiments 1 and 2 may include a gearbox assembly mounted with a mounting assembly 100 in a star configuration (e.g., as described with respect to FIGS. 2 and 3) or may include a gearbox assembly mounted with a mounting assembly 200 in a planetary configuration (e.g., FIGS. 4 and 5). Table 2 describes the structural stiffness K of the fan frame. The values above are exemplary for embodiments 1 and 2. Other structural stiffnesses for the fan frame may be selected. The structural stiffness of the fan frame may be defined by material properties, component dimensions, and other known factors that affect structural stiffness.

TABLE 2

| Embodiment | $K_{ff}^L$ (lb/in) | $K_{ff}^B$ (in-lb/rad) | $K_{ff}^T$ (in-lb/rad) |
|---|---|---|---|
| 1 | 1,020,408 | 448,430,493 | 1E+12 |
| 2 | 800,000 | 351,569,506 | 1E+12 |

The values for lateral, bending, and torsional structural stiffnesses of the fan frame for embodiments 1 and 2 are exemplary. The lateral structural stiffness of the fan frame may be less than or equal to 1,200,000 lb/in. In some examples, the lateral structural stiffness of the fan frame may be in the range of 400,000 lb/in to 1,200,000 lb/in, or any value or subrange therebetween. In some examples, the lateral structural stiffness of the fan frame may be in the range of 800,000 lb/in to 1,020,408 lb/in, or any value or subrange therebetween.

The bending structural stiffness of the fan frame may be less than or equal to 600,000,000 in-lb/rad. In some examples, the bending structural stiffness of the fan frame may be in the range of 200,000,000 in-lb/rad to 600,000,000 in-lb/rad, or any value or subrange therebetween. In some examples, the bending structural stiffness of the fan frame may be in the range of in the range of 351,569,506 in-lb/rad and 448,430,493 in-lb/rad, or any value or subrange therebetween.

The torsional structural stiffness of the fan frame may be 1E+12 in-lb/rad. In some examples, the torsional structural stiffness of the fan frame may be between 1E+11 in-lb/rad and 5E+12 in-lb/rad, or any value or subrange therebetween.

The lateral, bending and torsional stiffness values for the fan frame vary in this manner depending on thrust class, fan frame design, bearing placements and types of bearings supporting the gearbox position and their relative placements to the gearbox, size of the fan and other parts of engine where the fan frame is the primary loading bearing structure.

Once the fan frame values are generally known, it may be determined, using the IPR, the optimal design for the structure supporting the gearbox, starting from the general guideline of the stiffness for the flex mount and the flex coupling are lower (in the case of lateral and bending stiffness) or higher (in the case of torsional stiffness) than the fan frame. When used in combination a desirable stiffness for the flex mount and the flex coupling may be determined. For example, the relationships (15) and (18) are imported into the relationship (24) and the relationships (16) and (19) are imported into the relationship (25) to determine the structural stiffness of the flex mount in the lateral and bending directions, as defined in relationship (30). The relationships (17) and (20) are imported into the relationship (26) to determine the structural stiffness of the flex mount in the torsional direction, as defined in relationship (31).

The structural stiffness K of the flex mount is determined for steel and ground idle vibrations with an Impedance Parameter Ratio (IPR) of less than or equal to 0.5 for the lateral and bending directions and an IPR of greater than or equal to 0.01 for torsion. The loss factor n is 0.2 to 0.0003 for steel and rotational frequency of vibration w for ground idle may be taken as 3 krpm (314 rad/sec), which represents an average low pressure turbine rotational frequency of vibration lower than or equal to that experienced at ground idle conditions. This results in a structural stiffness of the flex mount defined by the relationship (30) for lateral and bending and the relationship (31) for torsional:

$$K_{fm} \leq 0.71 K_{ff} \quad (30)$$

$$K_{fm} \geq 0.1 K_{ff} \quad (31)$$

Inserting the values of Table 2 into relationships (30) and (31), the structural stiffness of the flex mount are determined as shown in Table 3.

TABLE 3

| Embodiment | $K_{fm}^L$ (lb/in) | $K_{fm}^B$ (in-lb/rad) | $K_{fm}^T$ (in-lb/rad) |
|---|---|---|---|
| 1 | ≤724,489 | ≤318,385,650 | ≥1E+11 |
| 2 | ≤568,000 | ≤249,614,395 | ≥1E+11 |

The values of the structural stiffness of the flex mount for embodiments 1 and 2 are exemplary. As discussed above, the structural stiffness of the flex mount may be determined as a relationship to the structural stiffness of the fan frame. Thus, the ranges of the respective lateral structural stiffness, bending structural stiffness, and torsional structural stiffness for the fan frame set forth above may be imparted into relationships (30) and (31) to determine the ranges of the respective lateral structural stiffness, bending structural stiffness, and torsional structural stiffness for the flex mount.

A similar process is performed to arrive at the structural stiffness of the flex coupling. That is, the relationships (21) and (18) are imported into the relationship (27) and the relationships (22) and (19) are imported into the relationship (28) to determine the structural stiffness of the flex coupling in the lateral and bending directions as defined in relationship (32). The relationships (23) and (20) are imported into the relationship (29) to determine the structural stiffness of the flex coupling in the torsional direction as defined in relationship (33).

The structural stiffness K of the flex coupling is determined for steel and ground idle vibrations with an IPR of less than or equal to 0.5 for the lateral and bending directions and an IPR of greater than or equal to 0.01 for the torsional direction. The loss factor η is 0.2 to 0.0003 for steel and the frequency of vibration ω for ground idle may be taken as 3 krpm (314 rad/sec), which represents a frequency of vibration lower than or equal to that experienced at ground idle conditions. This results in a structural stiffness of the flex coupling defined by the relationship (32) for lateral and bending and the relationship (33) for torsional:

$$K_{fc} \leq 0.71 K_{ff} \quad (32)$$

$$K_{fc} \geq 0.1 K_{ff} \quad (33)$$

Inserting the values of Table 2 into relationships (32) and (33), the structural stiffness of the flex coupling are determined as shown in Table 4.

TABLE 4

| Embodiment | $K_{f_c}^L$ (lb/in) | $K_{f_c}^B$ (in-lb/rad) | $K_{f_c}^T$ (in-lb/rad) |
|---|---|---|---|
| 1 | ≤724,489 | ≤318,385,650 | ≥1E+11 |
| 2 | ≤568,000 | ≤249,614,395 | ≥1E+11 |

The values of the structural stiffness of the flex coupling for embodiments 1 and 2 are exemplary. As discussed above, the structural stiffness of the flex coupling may be determined as a relationship to the structural stiffness of the fan frame. Thus, the ranges of the respective lateral structural stiffness, bending structural stiffness, and torsional structural stiffness for the fan frame set forth above may be imparted into relationships (32) and (33) to determine the ranges of the respective lateral structural stiffness, bending structural stiffness, and torsional structural stiffness for the flex coupling.

Figure 18A:
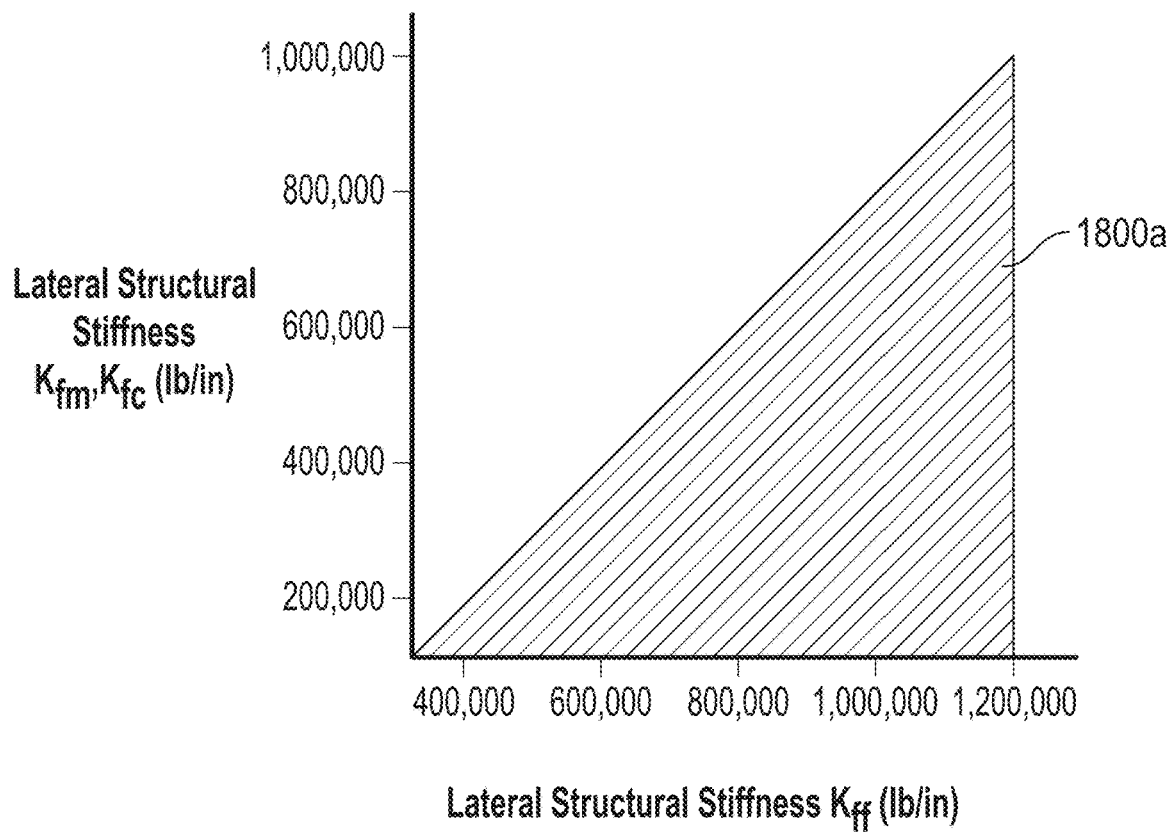
FIG. 18A shows a graph illustrating the lateral structural stiffness of the flex coupling and the flex mount as a function of the lateral structural stiffness of the fan frame.
Figure 18B:
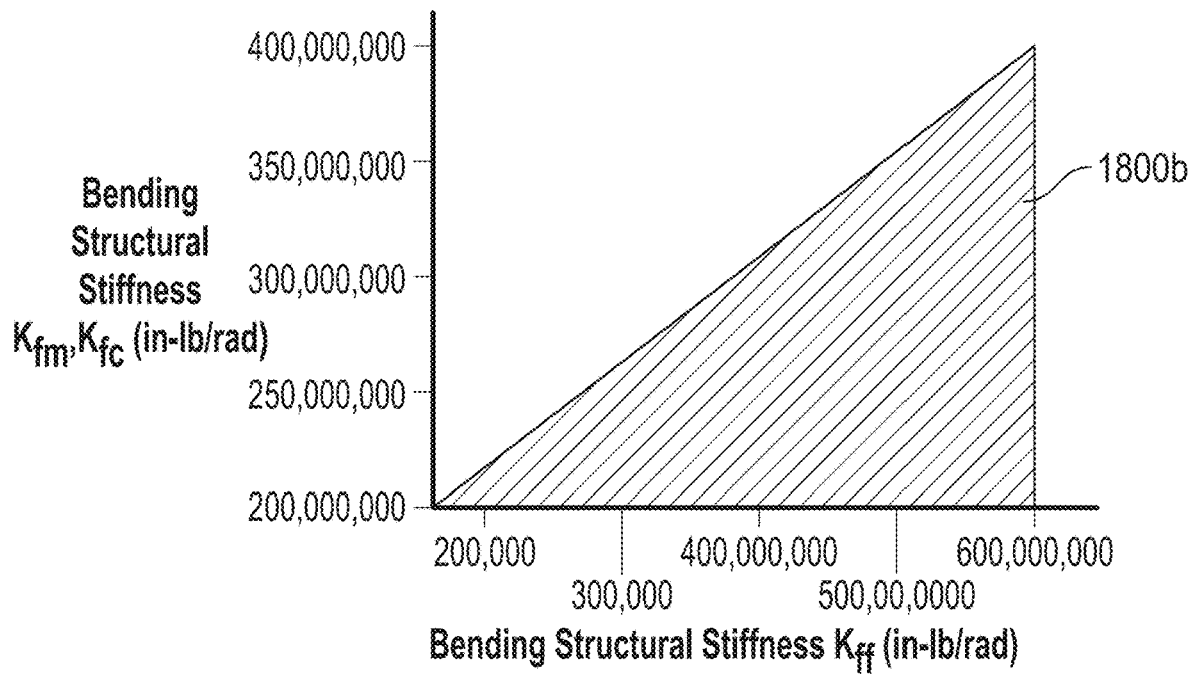
FIG. 18B shows a graph illustrating the bending structural stiffness of the flex coupling and the flex mount as a function of the bending structural stiffness of the fan frame.
Figure 18C:
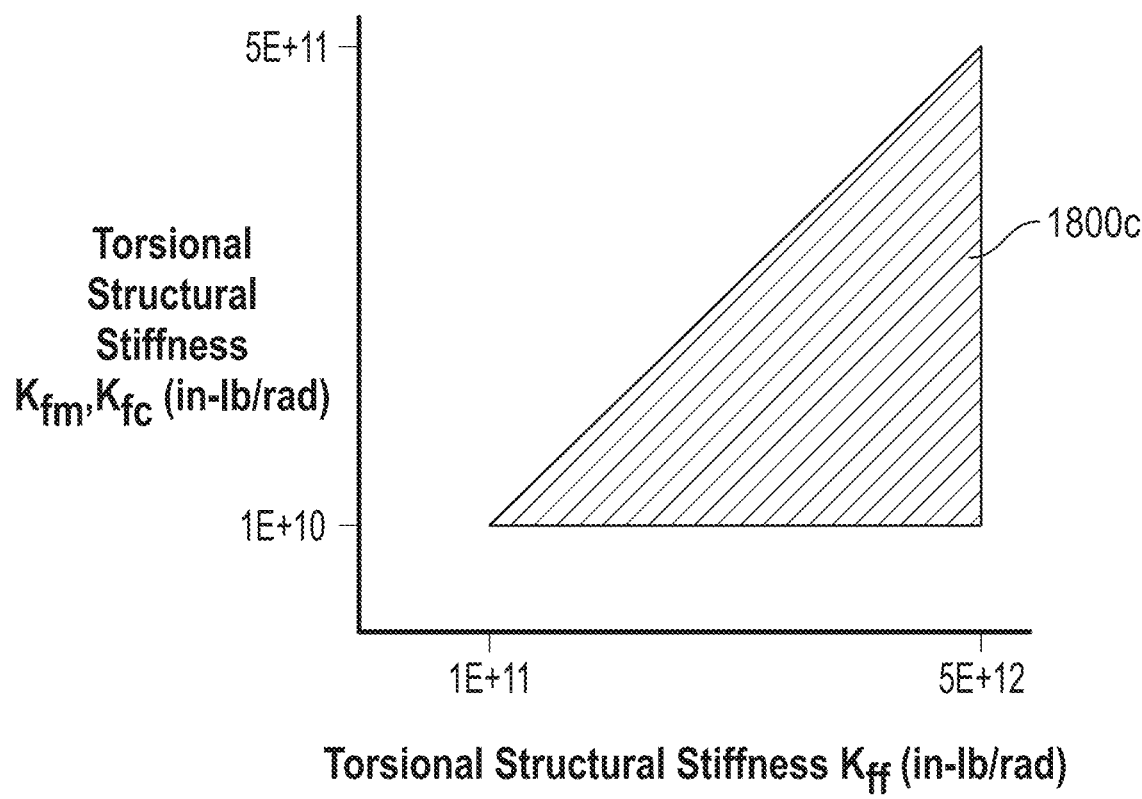
FIG. 18C shows a graph illustrating the torsional structural stiffness of the flex coupling and the flex mount as a function of the torsional structural stiffness of the fan frame.

Thus, as shown in FIGS. 18A to 18C, the structural stiffness of each of the flex coupling and the flex mount are a function or factor of the structural stiffness of the fan frame. For example, in FIG. 18A, the lateral structural stiffness of the flex mount and the flex coupling are a function of the lateral structural stiffness of the fan frame, as shown by area 1800a. In FIG. 18B, the bending structural stiffness of the flex mount and the flex coupling are a function of the bending structural stiffness of the fan frame, as shown by area 1800b. In FIG. 18C, the torsional structural stiffness of the flex mount and the flex coupling are a function of the torsional structural stiffness of the fan frame, as shown by area 1800c.

Furthermore, relying on Tables 2 to 4, the Impedance Parameter for the fan frame is determined for embodiments 1 and 2, to fall within the ranges shown in Table 5.

TABLE 5

| Embodiment | $Z_{ff}^L$ (lb/in)²-s/rad | $Z_{ff}^B$ (lb-in)²-s/rad³ | $Z_{ff}^T$ (lb-in)²-s/rad³ |
|---|---|---|---|
| 1 | 9.63E+8 to 9.95E+5 | 1.28E+14 to 1.92E+11 | 6.36E+20 to 9.55E+17 |
| 2 | 4.08E+8 to 6.11E+5 | 7.87E+13 to 1.18E+11 | 6.37E+20 to 9.55E+17 |

Accordingly, as discussed above, The Impedance Parameter not only accounts for structural stiffness (K), but, also for damping (C). This allows the Impedance Parameter to account for the dynamics of the mechanical system in addition to the static performance or integrity of the mechanical system. The stiffness addresses static loads and operating conditions and the damping addresses dynamic scenarios, for example, under rotation and inflight maneuvers. In addition to the lateral and the rotational or the bending stiffness, the Impedance Parameter defines desirable design choices for torsional stiffness as well.

Further aspects of the present disclosure are provided by the subject matter of the following clauses.

According to an aspect of the present disclosure, a mounting assembly for a gearbox assembly of a gas turbine engine includes a flex coupling configured to mount a first gear of the gearbox assembly to a rotating shaft of the gas turbine engine, a flex mount configured to mount a second gear of the gearbox assembly to an engine static structure, and a fan frame configured to mount a third gear of the gearbox assembly to the engine static structure. Each of the flex coupling and the flex mount is characterized by a lateral impedance parameter ratio, a bending impedance parameter ratio, and a torsional impedance parameter ratio. The lateral impedance parameter ratio of the flex coupling, the flex mount, or both is less than or equal to 0.5, the bending impedance parameter ratio of the flex coupling, the flex mount, or both is less than or equal to 0.5, and the torsional impedance parameter ratio of the flex coupling, the flex mount, or both is greater than or equal to 0.01.

According to an aspect of the present disclosure, a mounting assembly for a gearbox assembly of a gas turbine engine includes a flex coupling configured to mount a first gear of the gearbox assembly to a rotating shaft of the gas turbine engine, wherein the flex coupling is characterized by a lateral impedance parameter ratio less than or equal to 0.5.

According to an aspect of the present disclosure, a mounting assembly for a gearbox assembly of a gas turbine engine includes a flex coupling configured to mount a first gear of the gearbox assembly to a rotating shaft of the gas turbine engine, wherein the flex coupling is characterized by a bending impedance parameter ratio less than or equal to 0.5.

According to an aspect of the present disclosure, a mounting assembly for a gearbox assembly of a gas turbine engine include a flex coupling configured to mount a first gear of the gearbox assembly to a rotating shaft of the gas turbine engine, wherein the flex coupling is characterized by a torsional impedance parameter ratio greater than or equal to 0.01.

According to an aspect of the present disclosure, a mounting assembly for a gearbox assembly of a gas turbine engine includes a flex mount configured to mount a first gear of the gearbox assembly to an engine static structure, wherein the flex mount is characterized by a lateral impedance parameter ratio less than or equal to 0.5.

According to an aspect of the present disclosure, a mounting assembly for a gearbox assembly of a gas turbine engine includes a flex mount configured to mount a first gear of the gearbox assembly to an engine static structure, wherein the flex mount is characterized by a bending impedance parameter ratio less than or equal to 0.5.

According to an aspect of the present disclosure, a mounting assembly for a gearbox assembly of a gas turbine engine includes a flex mount configured to mount a first gear of the gearbox assembly to an engine static structure, wherein the flex mount is characterized by a torsional impedance parameter ratio greater than or equal to 0.01.

The mounting assembly of any preceding clause, further including a flex mount configured to mount a second gear of the gearbox assembly to an engine static structure, and a fan frame configured to mount a third gear of the gearbox assembly to the engine static structure.

The mounting assembly of any preceding clause, further including a flex coupling configured to mount a second gear of the gearbox assembly to a rotating shaft of the gas turbine engine, and a fan frame configured to mount a third gear of the gearbox assembly to the engine static structure.

The mounting assembly of any preceding clause, wherein the first gear is a sun gear, the second gear is a plurality of planet gears, and the third gear is a ring gear.

The mounting assembly of any preceding clause, wherein the first gear is a sun gear, the second gear is a ring gear, and the third gear is a plurality of planet gears.

The mounting assembly of any preceding clause, wherein the gearbox assembly is arranged in a planetary configuration.

The mounting assembly of any preceding clause, wherein the gearbox assembly is arranged in a star configuration.

The mounting assembly of any preceding clause, wherein the lateral impedance parameter ratio of the flex mount is less than or equal to 0.5.

The mounting assembly of any preceding clause, wherein the bending impedance parameter ratio of the flex mount is less than or equal to 0.5.

The mounting assembly of any preceding clause, wherein the lateral impedance parameter ratio of the flex coupling is less than or equal to 0.5.

The mounting assembly of any preceding clause, wherein the bending impedance parameter ratio of the flex coupling is less than or equal to 0.5.

The mounting assembly of any preceding clause, wherein the torsional impedance parameter ratio of the flex mount is greater than or equal to 0.01.

The mounting assembly of any preceding clause, wherein the torsional impedance parameter ratio of the flex mount is between 0.01 and 0.95.

The mounting assembly of any preceding clause, wherein the torsional impedance parameter ratio of the flex coupling is greater than or equal to 0.01.

The mounting assembly of any preceding clause, wherein the torsional impedance parameter ratio of the flex mount is between 0.01 and 0.95.

The mounting assembly of any preceding clause, wherein the flex coupling is characterized by a flex coupling lateral impedance parameter, a flex coupling bending impedance parameter, and a flex coupling torsional impedance parameter, the flex mount is characterized by a flex mount lateral impedance parameter, a flex mount bending impedance parameter, and a flex mount torsional impedance parameter, and the fan frame is characterized by a fan frame lateral impedance parameter, a fan frame bending impedance parameter, and a fan frame torsional impedance parameter.

The mounting assembly of any preceding clause, wherein the fan frame has a fan frame structural stiffness and the flex mount has a flex mount structural stiffness based on the fan frame structural stiffness.

The mounting assembly of any preceding clause, wherein the fan frame structural stiffness includes a fan frame lateral structural stiffness, a fan frame bending structural stiffness, and a fan frame torsional structural stiffness, and the flex mount structural stiffness includes a flex mount lateral structural stiffness, a flex mount bending structural stiffness, and a flex mount torsional structural stiffness, wherein the flex mount lateral structural stiffness and the flex mount bending structural stiffness are less than the fan frame lateral structural stiffness and the fan frame bending structural stiffness, respectively and wherein the flex mount torsional structural stiffness is greater than the fan frame torsional structural stiffness.

The mounting assembly of any preceding clause, wherein the fan frame has a fan frame structural stiffness and the flex coupling has a flex coupling structural stiffness based on the fan frame structural stiffness.

The mounting assembly of any preceding clause, wherein the fan frame structural stiffness includes a fan frame lateral structural stiffness, a fan frame bending structural stiffness, and a fan frame torsional structural stiffness, and the flex coupling structural stiffness includes a flex coupling lateral structural stiffness, a flex coupling bending structural stiffness, and a flex coupling torsional structural stiffness, wherein the flex coupling lateral structural stiffness and the flex coupling bending structural stiffness are less than, the fan frame lateral structural stiffness and the fan frame bending structural stiffness, respectively, and wherein the flex coupling torsional structural stiffness is greater than the fan frame torsional structural stiffness.

According to an aspect of the present disclosure, a gas turbine engine including a gearbox assembly configured to transfer rotational energy from a turbine section to a fan, and a mounting assembly for coupling the gearbox assembly to the gas turbine engine, the mounting assembly having a flex coupling configured to mount a first gear of the gearbox assembly to a rotating shaft of the gas turbine engine, a flex mount configured to mount a second gear of the gearbox assembly to an engine static structure, and a fan frame configured to mount a third gear of the gearbox assembly to the engine static structure. Each of the flex coupling and the flex mount is characterized by a lateral impedance parameter ratio, a bending impedance parameter ratio, and a torsional impedance parameter ratio, and wherein the lateral impedance parameter ratio of the flex coupling, the flex mount, or both is less than or equal to 0.5, wherein the bending impedance parameter ratio of the flex coupling, the flex mount, or both is less than or equal to 0.5, and wherein the torsional impedance parameter ratio of the flex coupling, the flex mount, or both is greater than or equal to 0.01.

The gas turbine engine of the preceding clause, further including an oil transfer device configured to deliver a lubricant to the gearbox assembly.

The gas turbine engine of any preceding clause, wherein the first gear is a sun gear, the second gear is a plurality of planet gears, and the fan frame is a ring gear.

The gas turbine engine of any preceding clause, wherein the first gear is a sun gear, the second gear is a ring gear, and the third gear is a plurality of planet gears.

The gas turbine engine of any preceding clause, wherein the gearbox assembly is mounted to the gas turbine engine in a planetary configuration.

The gas turbine engine of any preceding clause, wherein the gearbox assembly is mounted to the gas turbine engine in a star configuration.

The gas turbine engine of any preceding clause, wherein the lateral impedance parameter ratio of the flex mount is less than or equal to 0.5.

The gas turbine engine of any preceding clause, wherein the bending impedance parameter ratio of the flex mount is less than or equal to 0.5.

The gas turbine engine of any preceding clause, wherein the lateral impedance parameter ratio of the flex coupling is less than or equal to 0.5.

The gas turbine engine of any preceding clause, wherein the bending impedance parameter ratio of the flex coupling is less than or equal to 0.5.

The gas turbine engine of any preceding clause, wherein the torsional impedance parameter ratio of the flex mount is greater than or equal to 0.01.

The gas turbine engine of any preceding clause, wherein the torsional impedance parameter ratio of the flex mount is between 0.01 and 0.95.

The gas turbine engine of any preceding clause, wherein the torsional impedance parameter ratio of the flex coupling is greater than or equal to 0.01.

The gas turbine engine of any preceding clause, wherein the torsional impedance parameter ratio of the flex mount is between 0.01 and 0.95.

The gas turbine engine of any preceding clause, wherein the flex coupling is characterized by a flex coupling lateral impedance parameter, a flex coupling bending impedance parameter, and a flex coupling torsional impedance parameter, the flex mount is characterized by a flex mount lateral impedance parameter, a flex mount bending impedance parameter, and a flex mount torsional impedance parameter, and the fan frame is characterized by a fan frame lateral impedance parameter, a fan frame bending impedance parameter, and a fan frame torsional impedance parameter.

The gas turbine engine of any preceding clause, wherein the fan frame has a fan frame structural stiffness and the flex mount has a flex mount structural stiffness based on the fan frame structural stiffness.

The gas turbine engine of any preceding clause, wherein the fan frame structural stiffness includes a fan frame lateral structural stiffness, a fan frame bending structural stiffness, and a fan frame torsional structural stiffness, and the flex mount structural stiffness includes a flex mount lateral structural stiffness, a flex mount bending structural stiffness, and a flex mount torsional structural stiffness, wherein the flex mount lateral structural stiffness and the flex mount bending structural stiffness are less than the fan frame lateral structural stiffness and the fan frame bending structural stiffness, respectively and wherein the flex mount torsional structural stiffness is greater than the fan frame torsional structural stiffness.

The gas turbine engine of any preceding clause, wherein the fan frame has a fan frame structural stiffness and the flex coupling has a flex mount structural stiffness based on the fan frame structural stiffness.

The gas turbine engine of any preceding clause, wherein the fan frame structural stiffness includes a fan frame lateral structural stiffness, a fan frame bending structural stiffness, and a fan frame torsional structural stiffness, and the flex coupling structural stiffness includes a flex coupling lateral structural stiffness, a flex coupling bending structural stiffness, and a flex coupling torsional structural stiffness, wherein the flex coupling lateral structural stiffness and the flex coupling bending structural stiffness are less than, the fan frame lateral structural stiffness and the fan frame bending structural stiffness, respectively, and wherein the flex coupling torsional structural stiffness is greater than the fan frame torsional structural stiffness.

A mounting assembly for a gearbox assembly of a gas turbine engine, the mounting assembly including a flex coupling configured to mount a first gear of the gearbox assembly to a rotating shaft of the gas turbine engine, the first gear being a split sun gear comprising a forward sun gear and an aft sun gear separate from the forward sun gear, wherein the forward sun gear and the aft sun gear are each rotationally coupled to the rotating shaft, a flex mount configured to mount a second gear of the gearbox assembly to an engine static structure, and a fan frame configured to mount a third gear of the gearbox assembly to the engine static structure. Each of the flex coupling and the flex mount is characterized by a lateral impedance parameter ratio, a bending impedance parameter ratio, and a torsional impedance parameter ratio, wherein the lateral impedance parameter ratio of the flex coupling, the flex mount, or both is less than or equal to 0.5, wherein the bending impedance parameter ratio of the flex coupling, the flex mount, or both is less than or equal to 0.5, and wherein the torsional impedance parameter ratio of the flex coupling, the flex mount, or both is greater than or equal to 0.1.

The mounting assembly of the preceding clause, wherein the second gear is a single piece ring gear.

The mounting assembly of any preceding clause, wherein the third gear is a single piece ring gear.

The mounting assembly of any preceding clause, wherein the gearbox assembly further comprises a connection device for rotationally coupling the split sun gear to the rotating shaft.

The mounting assembly of any preceding clause, wherein the connection device comprises a forward support member extending from the forward sun gear, an aft support member extending from the aft sun gear, and a shaft coupling member.

The mounting assembly of any preceding clause, wherein the aft support member is rotationally coupled to the shaft coupling member with a curvic connection.

The mounting assembly of any preceding clause, wherein the shaft coupling member is rotationally coupled to the rotating shaft with a spline connection.

The mounting assembly of any preceding clause, wherein the forward support member is rotationally coupled to the aft support member with a curvic connection.

The mounting assembly of any preceding clause, wherein a first portion of the shaft coupling member extends from the forward support member and a second portion of the shaft coupling member extends from the aft support member, and the first portion and the second portion each comprises a spline connection with the rotating shaft.

The mounting assembly of any preceding clause, wherein the forward support member is coupled to the rotating shaft with a first spline connection, and the aft support member is coupled to the forward sun gear with a second spline connection.

A gas turbine engine including a fan and a turbine section having a rotating shaft drivingly coupled to the fan, an engine static structure, a gearbox assembly configured to transfer rotational energy from the turbine section to the fan, and a mounting assembly for coupling the gearbox assembly to the gas turbine engine, the mounting assembly having a flex coupling configured to mount a first gear of the gearbox assembly to the rotating shaft, the first gear being a split sun gear comprising a forward sun gear and an aft sun gear separate from the forward sun gear, wherein the forward sun gear and the aft sun gear are each rotationally coupled to the rotating shaft, a flex mount configured to mount a second gear of the gearbox assembly to an engine static structure, and a fan frame configured to mount a third gear of the gearbox assembly to the engine static structure. Each of the flex coupling and the flex mount is characterized by a lateral impedance parameter ratio, a bending impedance parameter ratio, and a torsional impedance parameter ratio, wherein the lateral impedance parameter ratio of the flex coupling, the flex mount, or both is less than or equal to 0.5, wherein the bending impedance parameter ratio of the flex coupling, the flex mount, or both is less than or equal to 0.5, and wherein the torsional impedance parameter ratio of the flex coupling, the flex mount, or both is greater than or equal to 0.1.

The gas turbine engine of any preceding clause, wherein the second gear is a single piece ring gear.

The gas turbine engine of any preceding clause, wherein the third gear is a single piece ring gear.

The gas turbine engine of any preceding clause, wherein the gearbox assembly further comprises a connection device for rotationally coupling the split sun gear to the rotating shaft.

The gas turbine engine of any preceding clause, wherein the connection device comprises a forward support member extending from the forward sun gear, an aft support member extending from the aft sun gear, and a shaft coupling member.

The gas turbine engine of any preceding clause, wherein the aft support member is rotationally coupled to the shaft coupling member with a curvic connection.

The gas turbine engine of any preceding clause, wherein the shaft coupling member is rotationally coupled to the rotating shaft with a spline connection.

The gas turbine engine of any preceding clause, wherein the forward support member is rotationally coupled to the aft support member with a curvic connection.

The gas turbine engine of any preceding clause, wherein a first portion of the shaft coupling member extends from the forward support member and a second portion of the shaft coupling member extends from the aft support member, and the first portion and the second portion each comprises a spline connection with the rotating shaft.

The gas turbine engine of any preceding clause, wherein the forward support member is coupled to the rotating shaft with a first spline connection, and the aft support member is coupled to the forward sun gear with a second spline connection.

Although the foregoing description is directed to the preferred embodiments, other variations and modifications will be apparent to those skilled in the art, and may be made without departing from the disclosure. Moreover, features described in connection with one embodiment may be used in conjunction with other embodiments, even if not explicitly stated above.

The invention claimed is:

1. A gearbox assembly for a gas turbine engine, the gearbox assembly comprising:
   a first gear, a second gear, and a third gear, the first gear being a split sun gear comprising a forward sun gear and an aft sun gear separate from the forward sun gear;
   a flex coupling configured to mount the forward sun gear and the aft sun gear to a rotating shaft of the gas turbine engine;
   a flex mount configured to mount the second gear to an engine static structure; and
   a fan frame configured to mount the third gear to the engine static structure,
   wherein each of the flex coupling and the flex mount is characterized by a lateral impedance parameter ratio, a bending impedance parameter ratio, and a torsional impedance parameter ratio,
   wherein the lateral impedance parameter ratio of the flex coupling, the flex mount, or both is less than or equal to 0.5,
   wherein the bending impedance parameter ratio of the flex coupling, the flex mount, or both is less than or equal to 0.5, and
   wherein the torsional impedance parameter ratio of the flex coupling, the flex mount, or both is greater than or equal to 0.1.

2. The gearbox assembly of claim 1, wherein the second gear is a single piece ring gear.

3. The gearbox assembly of claim 1, wherein the third gear is a single piece ring gear.

4. The gearbox assembly of claim 1, wherein the gearbox assembly further comprises a connection device for rotationally coupling the split sun gear to the rotating shaft.

5. The gearbox assembly of claim 4, wherein the connection device comprises a forward support member extending from the forward sun gear, an aft support member extending from the aft sun gear, and a shaft coupling member.

6. The gearbox assembly of claim 5, wherein the aft support member is rotationally coupled to the shaft coupling member with a curvic connection.

7. The gearbox assembly of claim 5, wherein the shaft coupling member is rotationally coupled to the rotating shaft with a spline connection.

8. The gearbox assembly of claim 5, wherein the forward support member is rotationally coupled to the aft support member with a curvic connection.

9. The gearbox assembly of claim 5, wherein a first portion of the shaft coupling member extends from the forward support member and a second portion of the shaft coupling member extends from the aft support member, and the first portion and the second portion each comprise a spline connection with the rotating shaft.

10. The gearbox assembly of claim 5, wherein the forward support member is coupled to the rotating shaft with a first spline connection, and the aft support member is coupled to the forward sun gear with a second spline connection.

11. A gas turbine engine comprising:
    a fan and a turbine section having a rotating shaft drivingly coupled to the fan;
    an engine static structure;
    a gearbox assembly configured to transfer rotational energy from the turbine section to the fan; and
    a mounting assembly for coupling the gearbox assembly to the gas turbine engine, the mounting assembly having:
       a flex coupling configured to mount a first gear of the gearbox assembly to the rotating shaft, the first gear being a split sun gear comprising a forward sun gear and an aft sun gear separate from the forward sun gear, wherein the forward sun gear and the aft sun gear are each rotationally coupled to the rotating shaft;
       a flex mount configured to mount a second gear of the gearbox assembly to an engine static structure; and
       a fan frame configured to mount a third gear of the gearbox assembly to the engine static structure,
    wherein each of the flex coupling and the flex mount is characterized by a lateral impedance parameter ratio, a bending impedance parameter ratio, and a torsional impedance parameter ratio,
    wherein the lateral impedance parameter ratio of the flex coupling, the flex mount, or both is less than or equal to 0.5,
    wherein the bending impedance parameter ratio of the flex coupling, the flex mount, or both is less than or equal to 0.5, and
    wherein the torsional impedance parameter ratio of the flex coupling, the flex mount, or both is greater than or equal to 0.1.

12. The gas turbine engine of claim 11, wherein the second gear is a single piece ring gear.

13. The gas turbine engine of claim 11, wherein the third gear is a single piece ring gear.

14. The gas turbine engine of claim 11, wherein the gearbox assembly further comprises a connection device for rotationally coupling the split sun gear to the rotating shaft.

15. The gas turbine engine of claim 14, wherein the connection device comprises a forward support member extending from the forward sun gear, an aft support member extending from the aft sun gear, and a shaft coupling member.

16. The gas turbine engine of claim 15, wherein the aft support member is rotationally coupled to the shaft coupling member with a curvic connection.

17. The gas turbine engine of claim 15, wherein the shaft coupling member is rotationally coupled to the rotating shaft with a spline connection.

18. The gas turbine engine of claim 15, wherein the forward support member is rotationally coupled to the aft support member with a curvic connection.

19. The gas turbine engine of claim 15, wherein a first portion of the shaft coupling member extends from the forward support member and a second portion of the shaft coupling member extends from the aft support member, and the first portion and the second portion each comprise a spline connection with the rotating shaft.

20. The gas turbine engine of claim 15, wherein the forward support member is coupled to the rotating shaft with a first spline connection, and the aft support member is coupled to the forward sun gear with a second spline connection.

* * * * *